US006456275B1

(12) United States Patent
Hinckley et al.

(10) Patent No.: US 6,456,275 B1
(45) Date of Patent: *Sep. 24, 2002

(54) PROXIMITY SENSOR IN A COMPUTER INPUT DEVICE

(75) Inventors: Kenneth P. Hinckley, Kirkland; Todd E. Holmdahl, Bothell; Timothy T. Brewer; Steven T. Kaneko, both of Seattle; Michael J. Sinclair, Kirkland, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,434

(22) Filed: Sep. 14, 1998

(51) Int. Cl.[7] .................................................. G09G 5/00
(52) U.S. Cl. ...................... 345/156; 345/161; 345/163; 345/168
(58) Field of Search ................................ 345/157, 158, 345/161, 163–168, 156, 173; 178/18.03, 19.01

(56) References Cited

U.S. PATENT DOCUMENTS

| 4,317,956 A | | 3/1982 | Torok et al. | |
| 4,403,777 A | * | 9/1983 | Del Principle et al. | ..... 273/313 |
| 4,977,397 A | | 12/1990 | Kuo et al. | |
| 5,208,903 A | | 5/1993 | Curry | |
| 5,309,172 A | | 5/1994 | Fox | |
| 5,355,148 A | | 10/1994 | Anderson | |
| 5,426,450 A | | 6/1995 | Drumm | ....................... 345/168 |
| 5,457,480 A | | 10/1995 | White | |
| 5,530,455 A | | 6/1996 | Gillick et al. | ................ 345/163 |
| 5,559,301 A | | 9/1996 | Bryan, Jr., et al. | |
| 5,572,238 A | | 11/1996 | Krivacic | |
| 5,598,527 A | | 1/1997 | Debrus et al. | |
| 5,635,958 A | | 6/1997 | Murai et al. | ................. 345/168 |
| 5,666,113 A | | 9/1997 | Logan | ........................ 341/34 |
| 5,666,499 A | | 9/1997 | Baudel et al. | |
| 5,675,361 A | | 10/1997 | Santilli | ........................ 345/168 |
| 5,694,153 A | * | 12/1997 | Aoyagi et al. | ............... 345/161 |
| 5,698,822 A | | 12/1997 | Haneda et al. | |
| 5,751,260 A | | 5/1998 | Nappi et al. | |
| 5,767,457 A | * | 6/1998 | Gerpheide et al. | ............. 178/18 |
| 5,793,356 A | * | 8/1998 | Svancarek et al. | ........... 345/161 |
| 5,798,752 A | | 8/1998 | Buxton et al. | |
| 5,805,144 A | | 9/1998 | Scholder et al. | ............. 345/173 |
| 5,812,114 A | * | 9/1998 | Loop | .......................... 345/157 |
| 5,818,800 A | * | 10/1998 | Barker | ........................ 369/25 |
| 5,825,356 A | | 10/1998 | Habib et al. | |

(List continued on next page.)

OTHER PUBLICATIONS

Ravin Balakrishnan and Pranay Patel, "The PadMouse: Facilitating Selection and Spatial Positioning for the Non-Dominant Hand," CHI98, Apr. 18–23, 1998, pp. 9–16.

Thomas G. Zimmerman et al., "Applying Electric Field Sensing to Human–Computer Interfaces," CHI '95 Mosaic of Creativity, May 7–11, 1995, pp. 280–287.

(List continued on next page.)

*Primary Examiner*—Richard Hjerpe
*Assistant Examiner*—Kimnhung Nguyen
(74) *Attorney, Agent, or Firm*—Banner & Witcoff, Ltd.

(57) ABSTRACT

An input device for a computer system includes an exterior surface and a touch sensor located on the exterior surface. The touch sensor is adapted to generate an electrical signal when a user touches the touch sensor. The electrical signal contains touch information that is the same each time the user touches the touch sensor regardless of where the user's touch occurs on the touch sensor. The input device also includes an input generator capable of generating input information sent to the computer system. The input information includes at least a depressible key's state, a depressible button's state, sound information, or movement information.

28 Claims, 25 Drawing Sheets

U.S. PATENT DOCUMENTS

| | | | |
|---|---|---|---|
| 5,828,360 A | 10/1998 | Anderson et al. | 345/146 |
| 5,841,425 A | 11/1998 | Zenz, Sr. | 345/163 |
| 5,844,547 A | * 12/1998 | Minakuchi et al. | 345/173 |
| 5,847,695 A | * 12/1998 | Duncan et al. | 345/163 |
| 5,877,750 A | 3/1999 | Hanson | |
| 5,910,798 A | 6/1999 | Kim | |
| 5,910,800 A | 6/1999 | Shields et al. | |
| 5,910,802 A | 6/1999 | Shields et al. | |
| 5,914,702 A | * 6/1999 | Derocher et al. | 345/157 |
| 5,914,707 A | * 6/1999 | Kono | 345/173 |
| 5,943,052 A | 8/1999 | Allen et al. | |
| 5,973,622 A | * 10/1999 | Chiang | 345/160 |
| 5,977,952 A | 11/1999 | Francis | |
| 5,982,302 A | 11/1999 | Ure | |
| 5,995,101 A | 11/1999 | Clark et al. | |
| 6,005,496 A | * 12/1999 | Hargreaves et al. | 341/22 |
| 6,016,520 A | * 1/2000 | Kono | 345/173 |
| 6,040,821 A | 3/2000 | Franz et al. | |
| 6,046,728 A | * 4/2000 | Hume et al. | 345/157 |
| 6,097,371 A | * 8/2000 | Siddiqui et al. | 345/164 |
| 6,100,875 A | 8/2000 | Goodman et al. | |
| 6,121,960 A | 9/2000 | Carroll et al. | |
| 6,166,723 A | * 12/2000 | Schena et al. | 345/184 |

OTHER PUBLICATIONS

J.R. Smith, "Field Mice: Extracting Hand Geometry From Electric Field Measurements," IBM Systems Journal, vol. 35, Nos. 3 & 4, 1996, pp. 587–608.

Joshua Smith et al., "Electric Field Sensing for Graphical Interfaces," MIT Media Laboratory—Special Issue on Input Devices, IEEE Computer Graphics an Applications, May 1998.

Beverly L. Harrison et al., "Squeeze Me, Hold Me, Tilt Me! An Exploration of Manipulative User Interfaces," CHI 98, Apr. 18–23, 1998, pp. 17–24.

Buxton, W., Hill, R., Rowley, P., "Issues and Techniques in Touch–Sensitive Tablet Input," Computer Graphics, 19 (3) : pp. 215–224, 1985.

Herot, C., Weinzapfel, G., "One–Point Touch Input of Vector Information from Computer Displays," Computer Graphics, 12(3) : pp. 210–216, 1978.

Rouse, P., Touch–sensitive joystick, Radio & Electronics World, Feb. 1985, 23–26.

Microsoft Windows User's Guide, 1992, Doc. No. PC21669–0492, pp. 16, 17, 30, 31, 152, 153, 175, 337, 451, 452, 455.

Using Windows NT Worstation 4, $2^{nd}$ Ed., pp. 36, 37, 292–295, 1998, QUE.

Buxton, W. (1997). Living in Augmented Reality: Ubiquitous Media and Reactive Environments. In K. Finn, A. Sellen & S. Wilber (Eds.). Video Mediated Communication. Hillsdale, N.J.: Erlbaum, 363–384. An earlier version of this chapter also appears in Proceedings of Imagina '95, 215 –229.

"The Design of a GUI Paradigm based on Tablets, Twohands and Transparency", Proceedings of Computer–Human Interaction (CHI) 1997, Atlanta, Georgia, 22–27 Mar. 1997, pp. 35–42.

K. Fishkin et al., "Enhanced Dynamic Queries via Movable Filters", Proceedings of CHI 1995 Conference, pp. 415–420 (as downloaded from http://www.parc.xerox.com/istl/projects/MagicLenses/DynamicQueries.html on Sep. 25, 1998, pp. 1–13).

E.A. Bier et al., "A Taxonomy of See–through Tools", Proceedings of CHI 1994 Conferences, Apr. 1994, Boston, Massachusetts, pp. 517–523.

M.C. Stone et al., "The Movable Filter as a User Interface Tool" Proceedings of CHI 1994 Conference, Apr. 1994, Boston, Mssachusetts, pp. 306–312 (as downloaded from http://www.parc.xerox.com/istl/projects/MagicLenses/94CHIFilters.html on Sep. 24, 1998, pp. 1–15).

E.A. Bier et al. "Toolglass and Magic Lenses: The See–Through Interface", Proceedings of the Annual Conference on Computer Graphics SIGGRAPH 93, Anaheim, California, Aug. 1–6, 1993, pp. 73–80.

W. Buxton et al., "A Study in Two–Handed Input", Proceedings of CHI '86, Boston, Massachusetts, Apr. 13–17, 1986, pp. 321–326.

B. Buxton, "Integrating the Periphery and Context: A New Taxonomy of Telematics", Computer Systems Research Institute (CSRI, University of Toronto & Alias Research Inc., pp. 1–10, downloaded on Mar. 23, 1999 from:http://www.dgp.toronto.edu/people/rroom/research/papers/bg__fg/bg__fg.html.

W. Buxton et al., "A Microcomputer–based Conducting System", Computer Music Journal, vol. 4, No. 1, Spring 1980, contents and pp. 8–21.

Ken Hinckley et al., "Interaction and Modeling Techniques for Desktop Two–Handed Input," Proceedings of ACM UIT'98 Symposium on User Interface Software and Technology, pp. 49–58.

Ken Hinckley and Mike Sinclair, "Touch–Sensing Input Devices," To Appear in ACM CHI'99 Conf. On Human Factors in computing Systems.

Albrecht Schmidt, "Implicit Human Computer Interaction Through Context," Telecooperation Office (TecO), University of Karlsruhe Germany.

"Personal Computer Environmental Control Via a Proximity Sensor," IBM Technical Disclosure Bulletin, vol. 36, No. 08, Aug. 1993.

J. Mackinlay et al., "A Semantic Analysis of the Design Space of Input Devices", Human–Computer Interaction, vol. 5, 1991, pp. 145–190.

S. Card et al. "A Morphological Analysis of the Design Space of Input Devices", ACM Transactions on Information Systems, vol. 9, No. 2, Apr. 1991, pp. 99–122.

W. Buxton et al., "A three–state model of graphical input", Proceedings of INTERACT –90, Amsterdam, Netherladns, 1990, pp. 449–456.

* cited by examiner

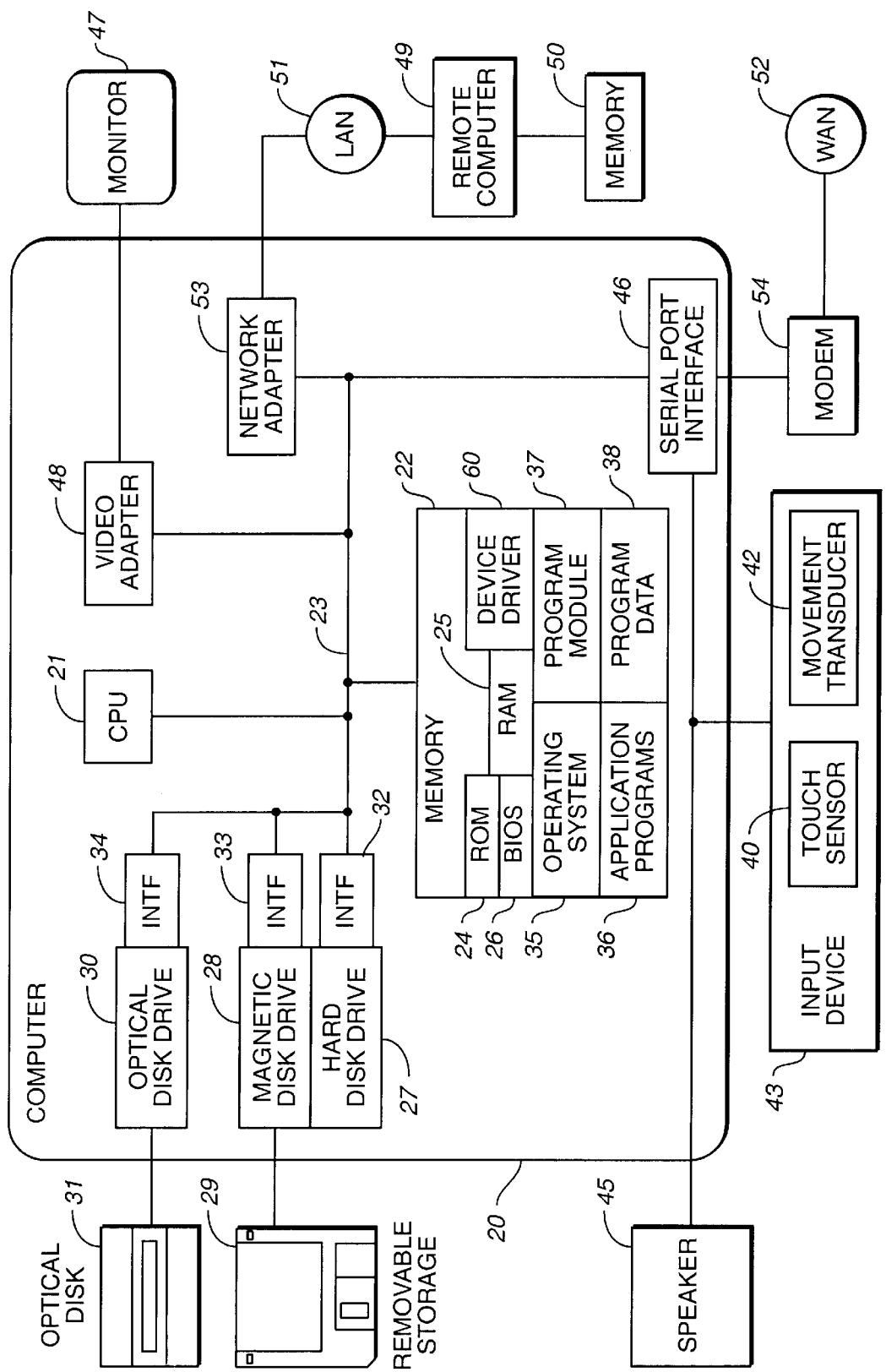
FIG._1

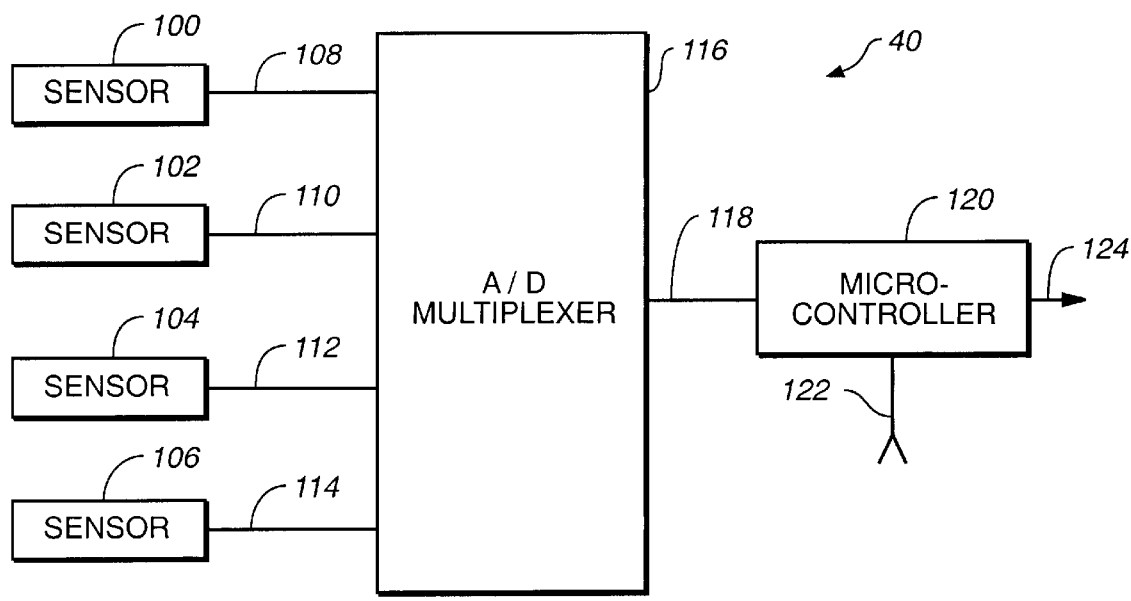
FIG._2
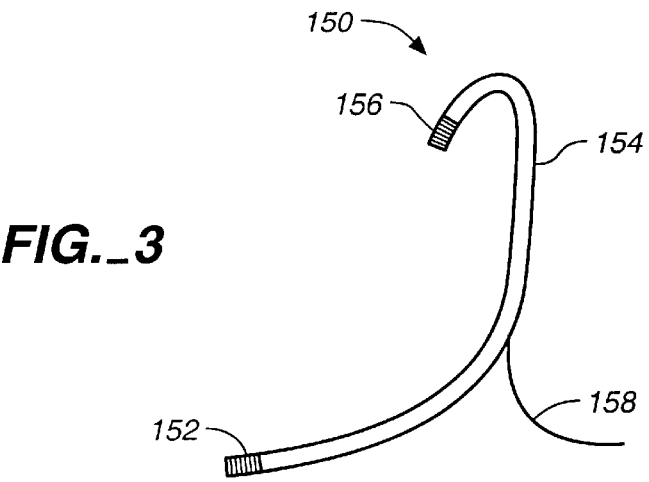
FIG._3

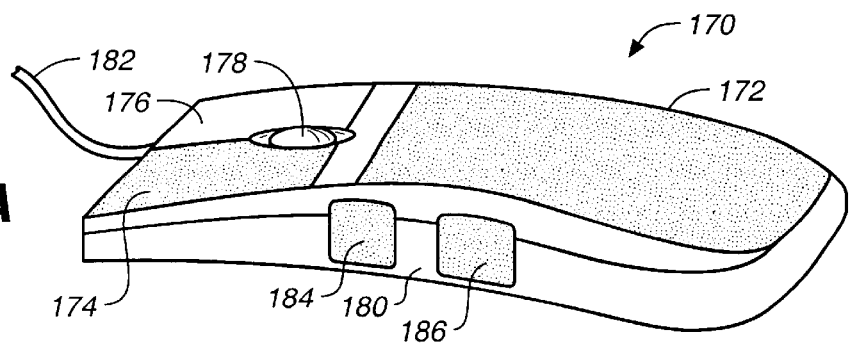
FIG._4A
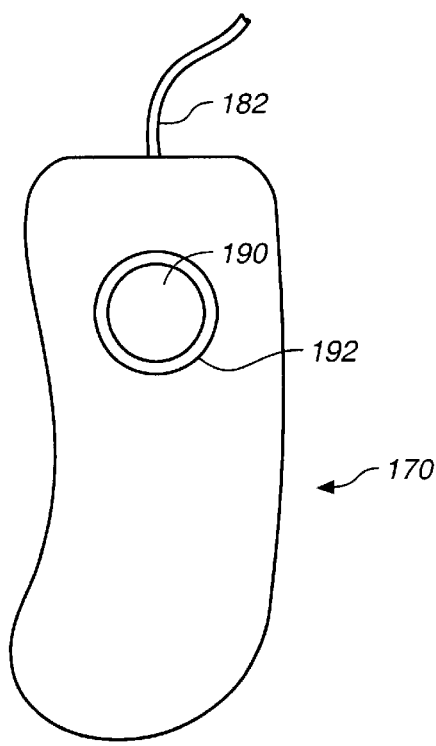
FIG._4B
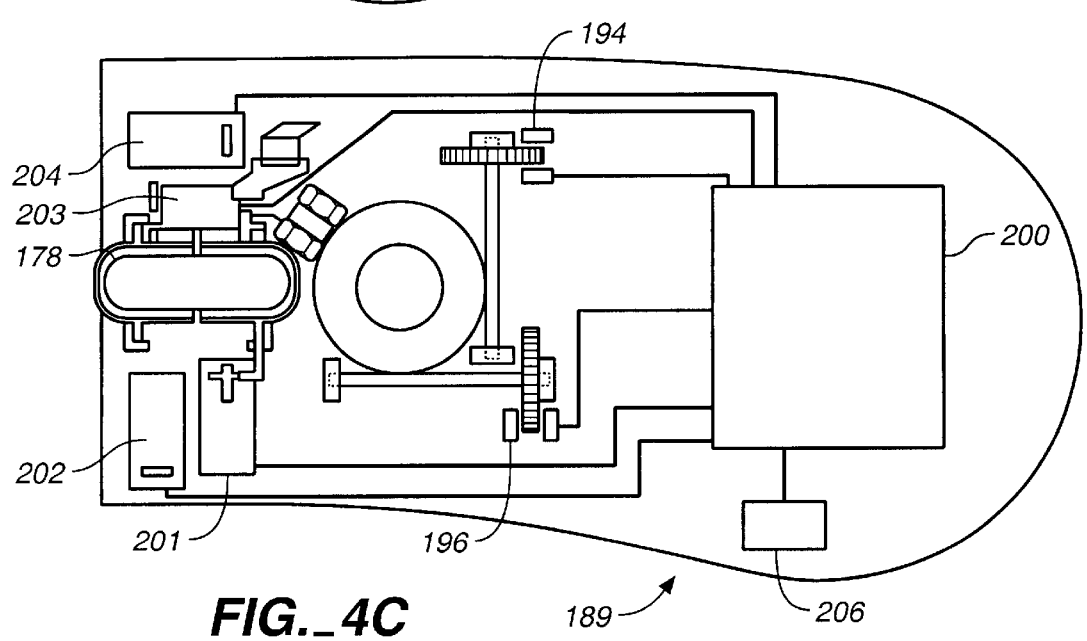
FIG._4C

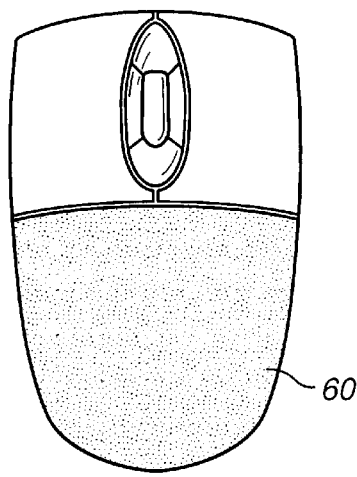
FIG._5
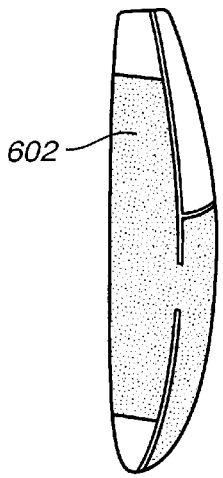
FIG._6A
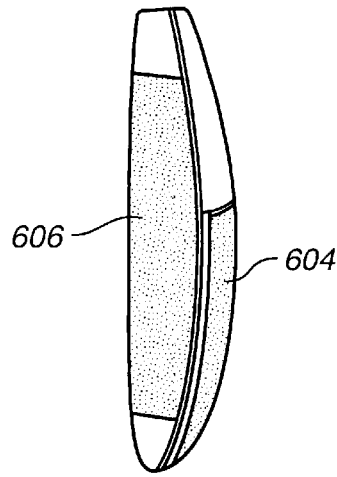
FIG._6B
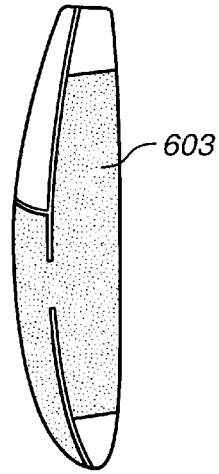
FIG._6C
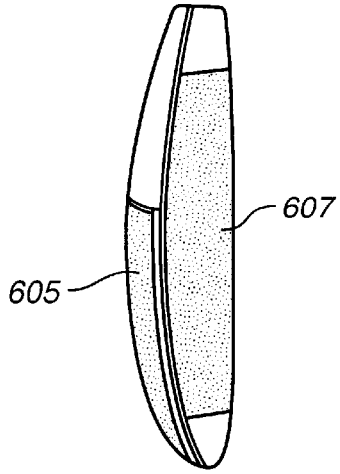
FIG._6D

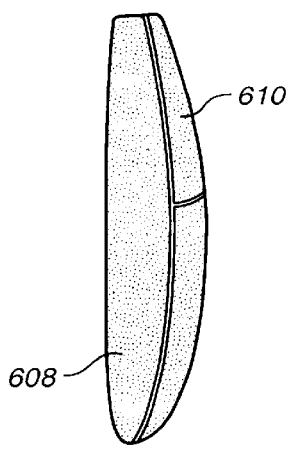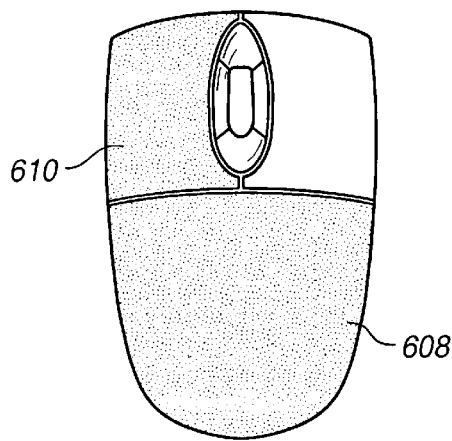
FIG._7A  FIG._7B
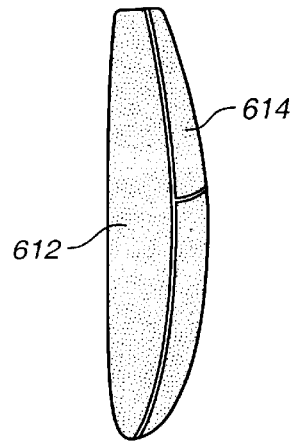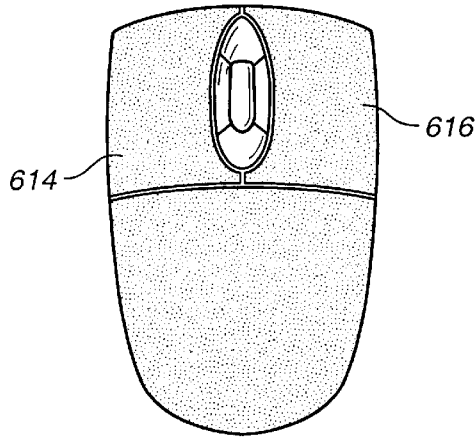
FIG._8A  FIG._8B
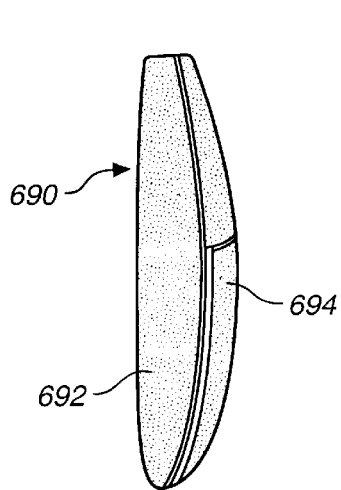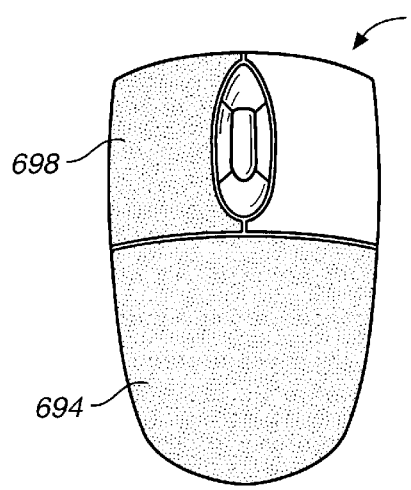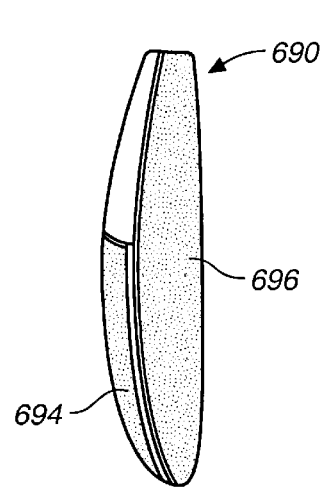
FIG._9A  FIG._9B  FIG._9C

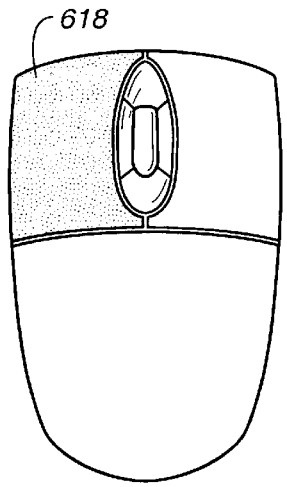
FIG._10A
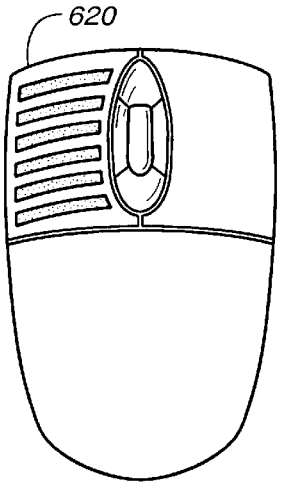
FIG._10B
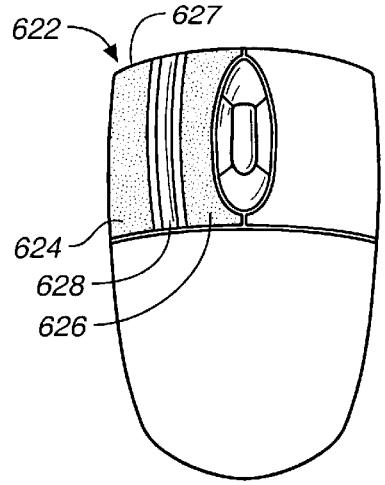
FIG._10C
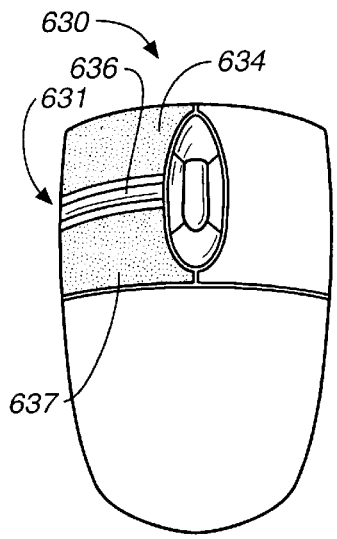
FIG._10D
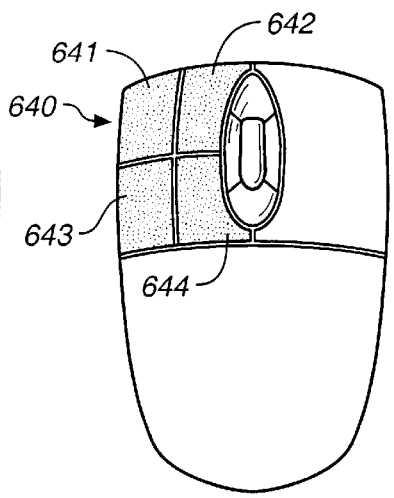
FIG._10E
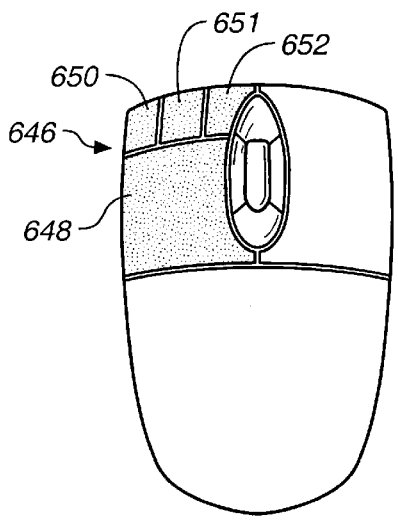
FIG._10F

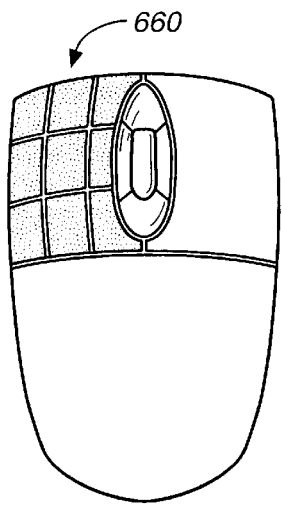
FIG._10G
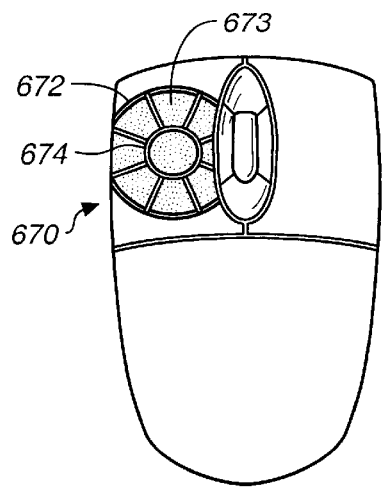
FIG._10H
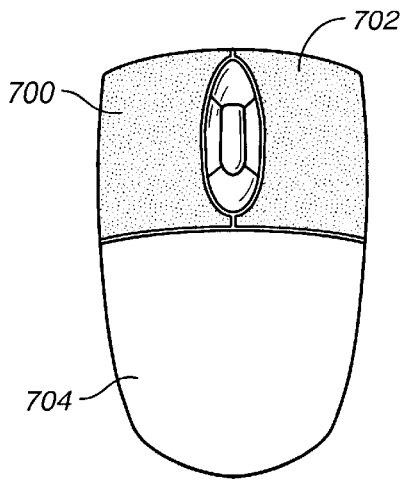
FIG._11A
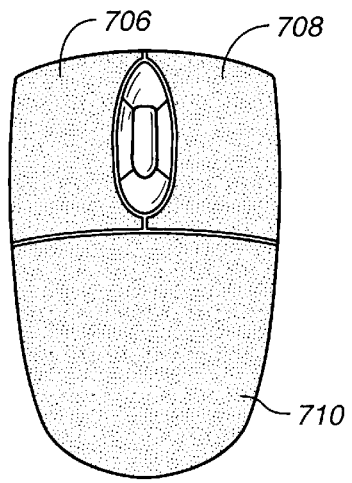
FIG._11B
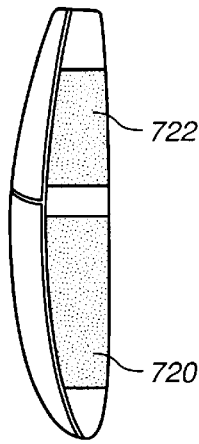
FIG._12A
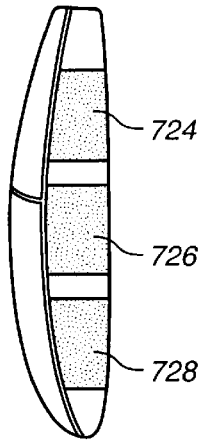
FIG._12B

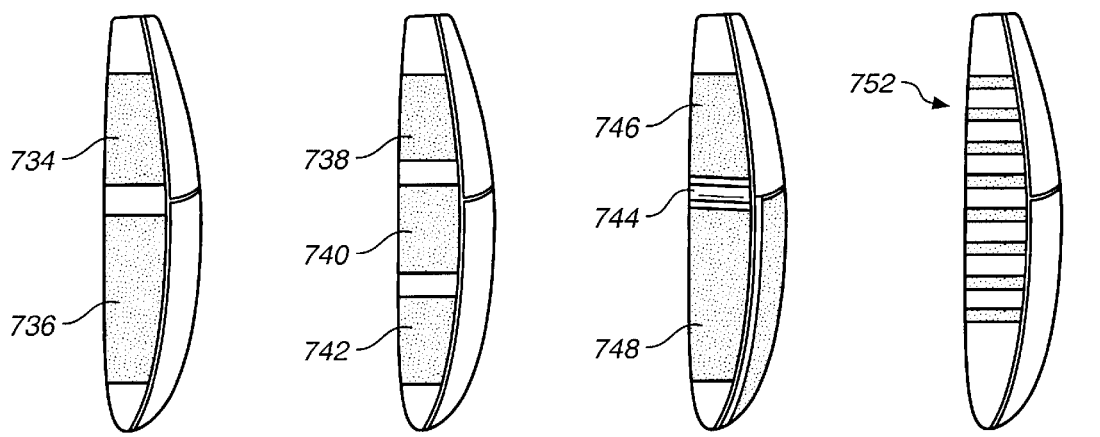
FIG._13A  FIG._13B  FIG._13C  FIG._13D
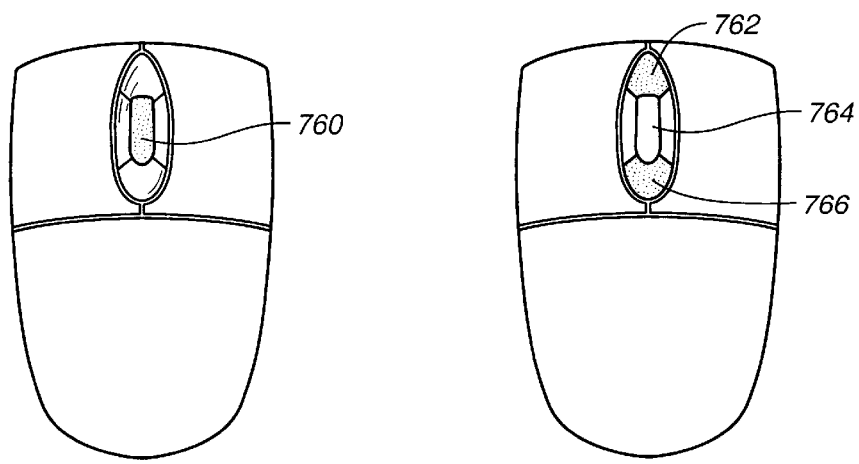
FIG._14A  FIG._14B
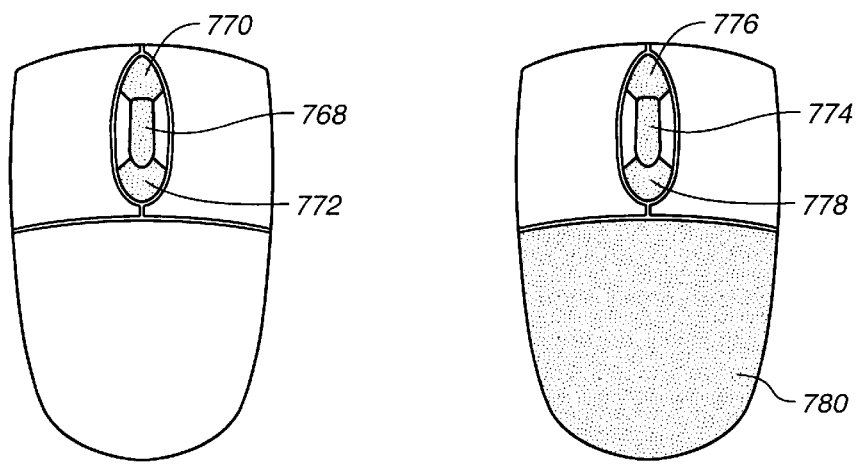
FIG._14C  FIG._14D

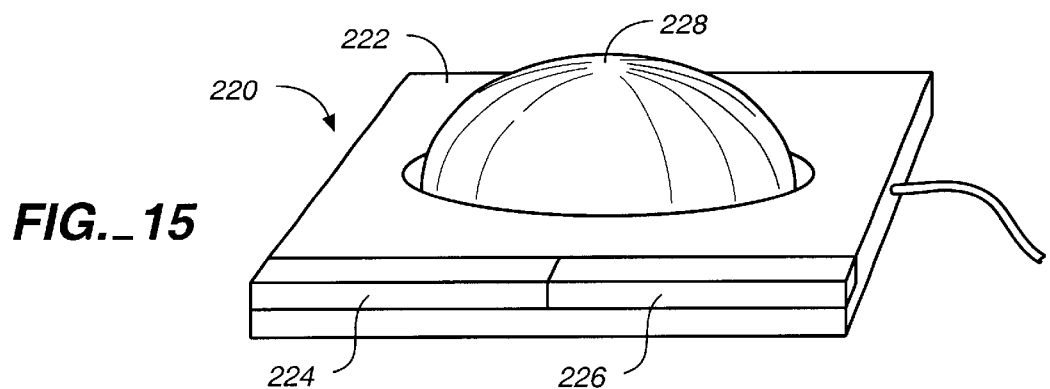
FIG._15
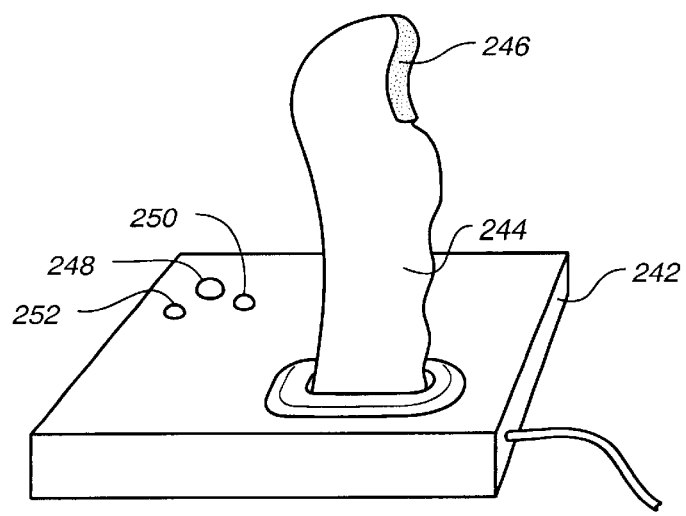
FIG._16
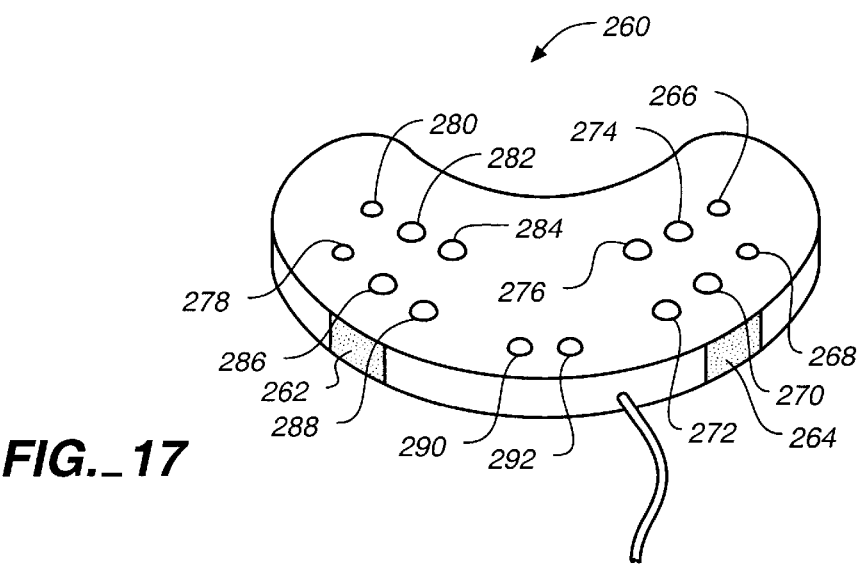
FIG._17

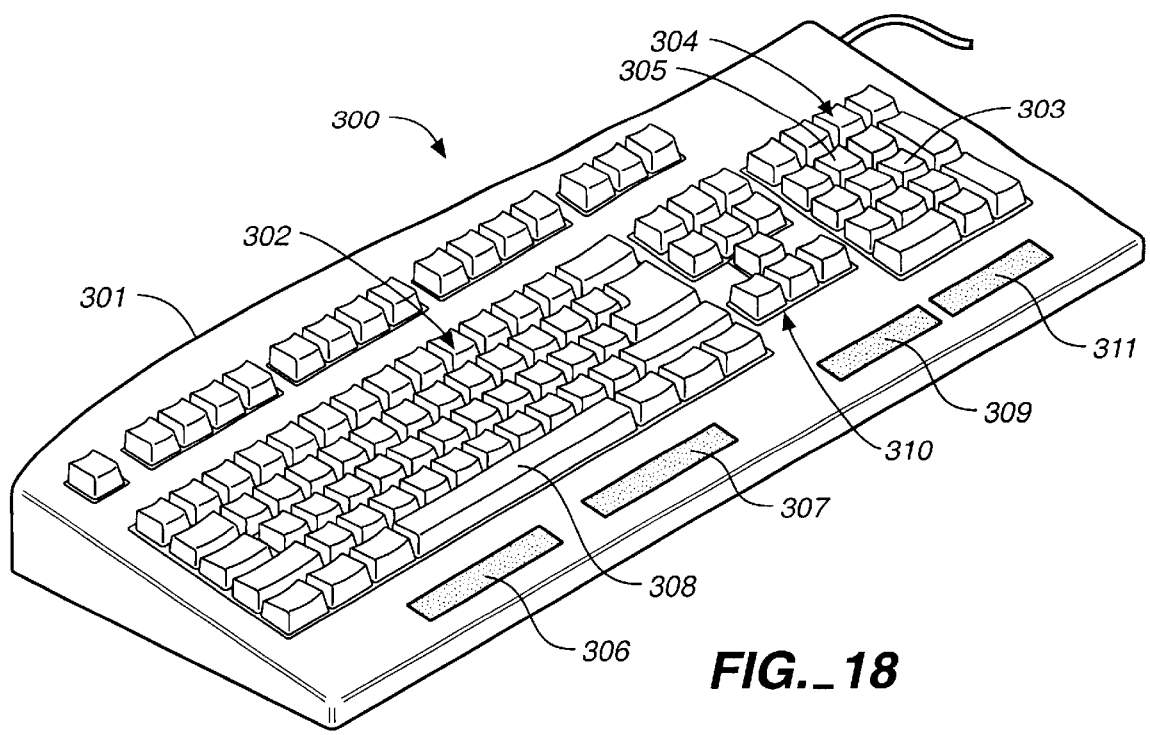
FIG._18
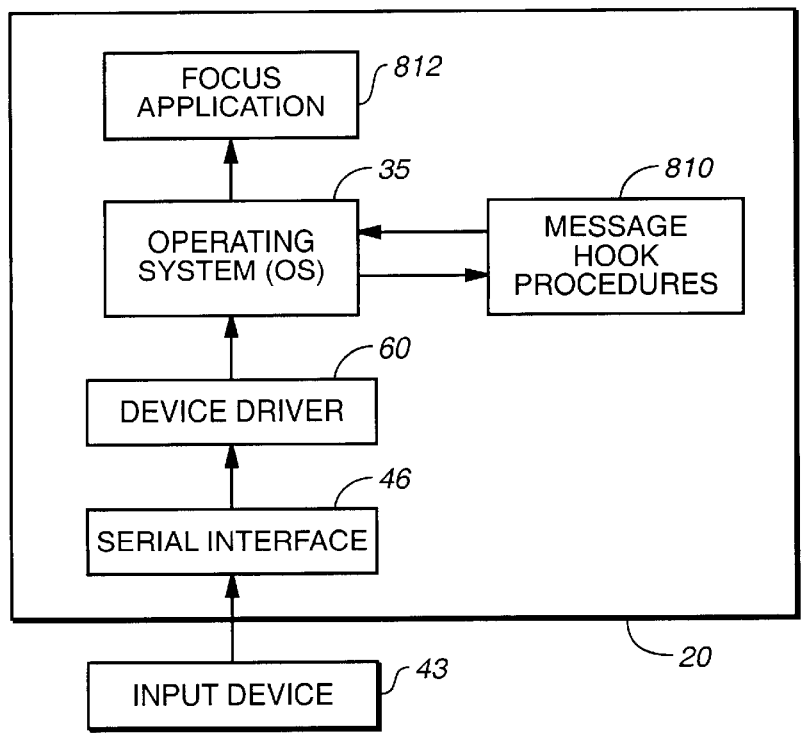
FIG._19

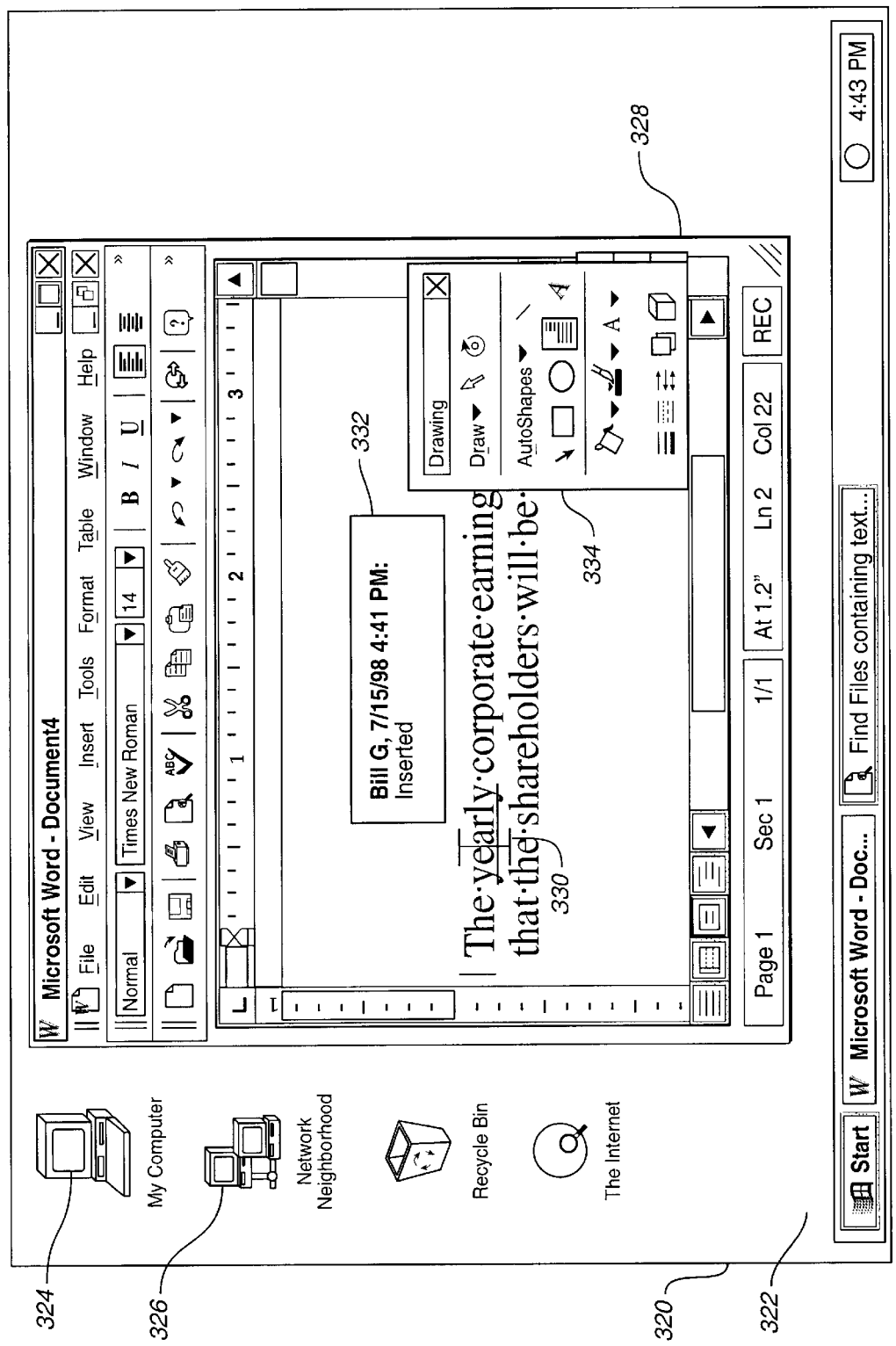
*FIG._20*

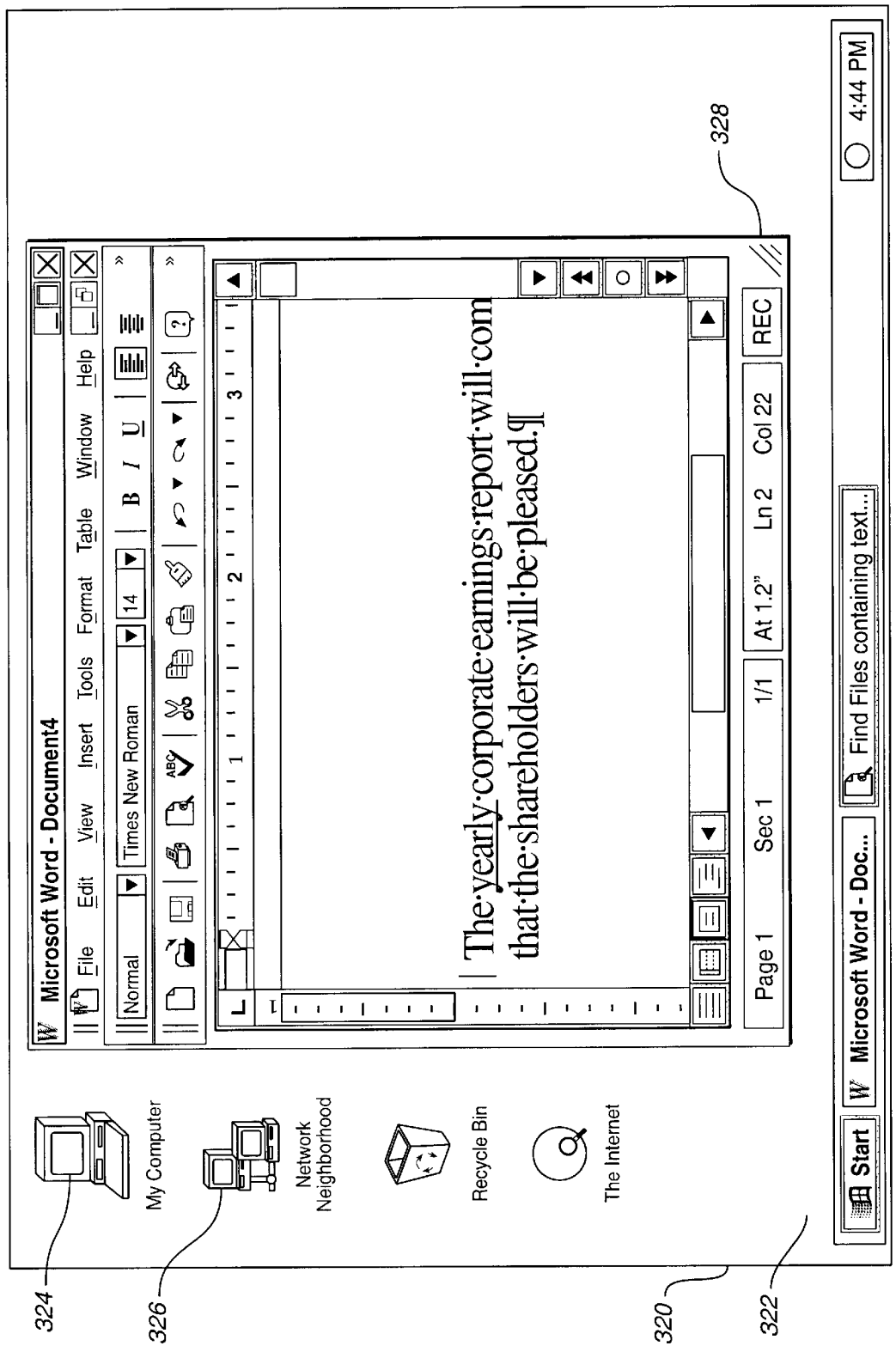
FIG._21

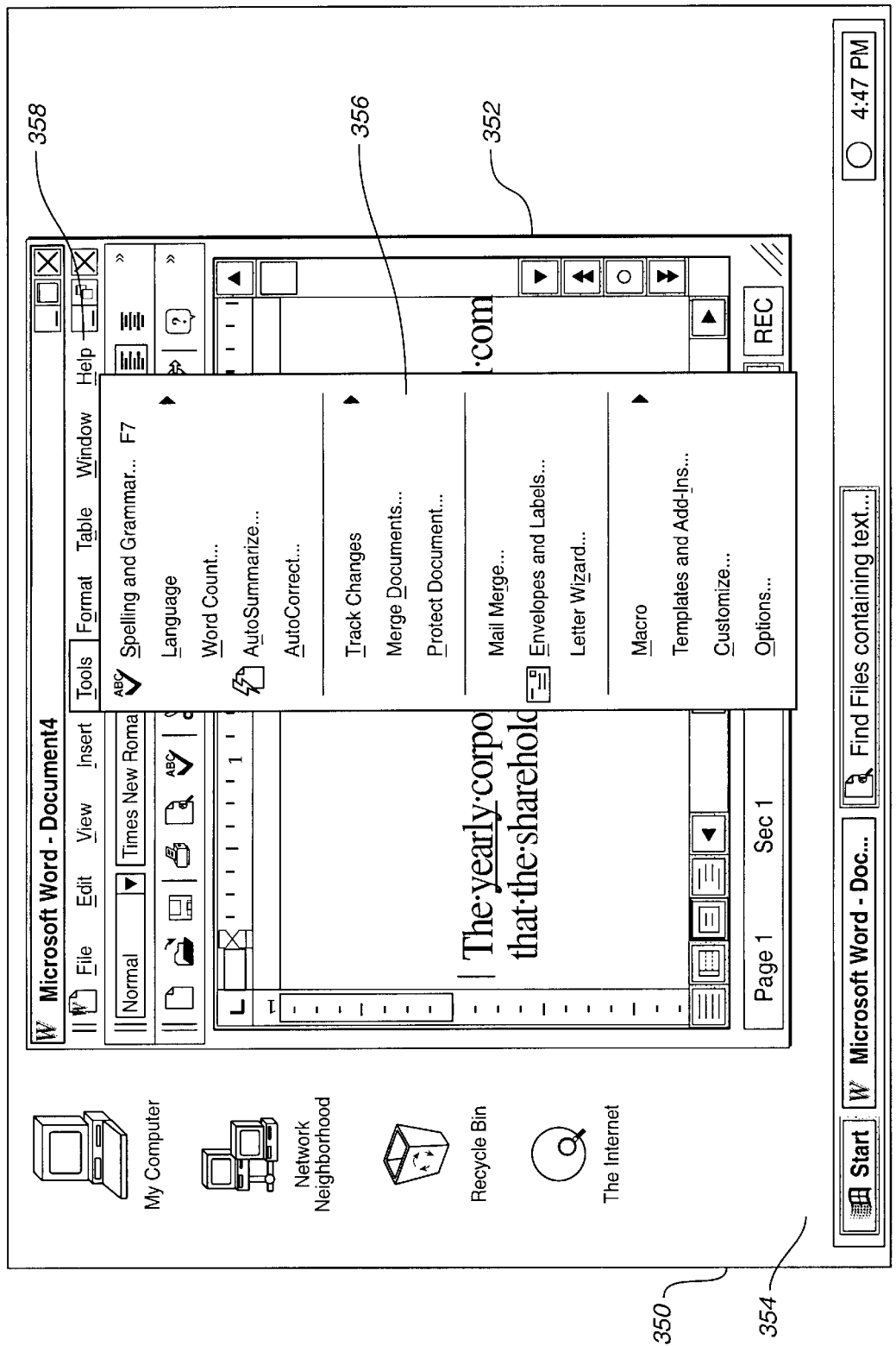
FIG._22

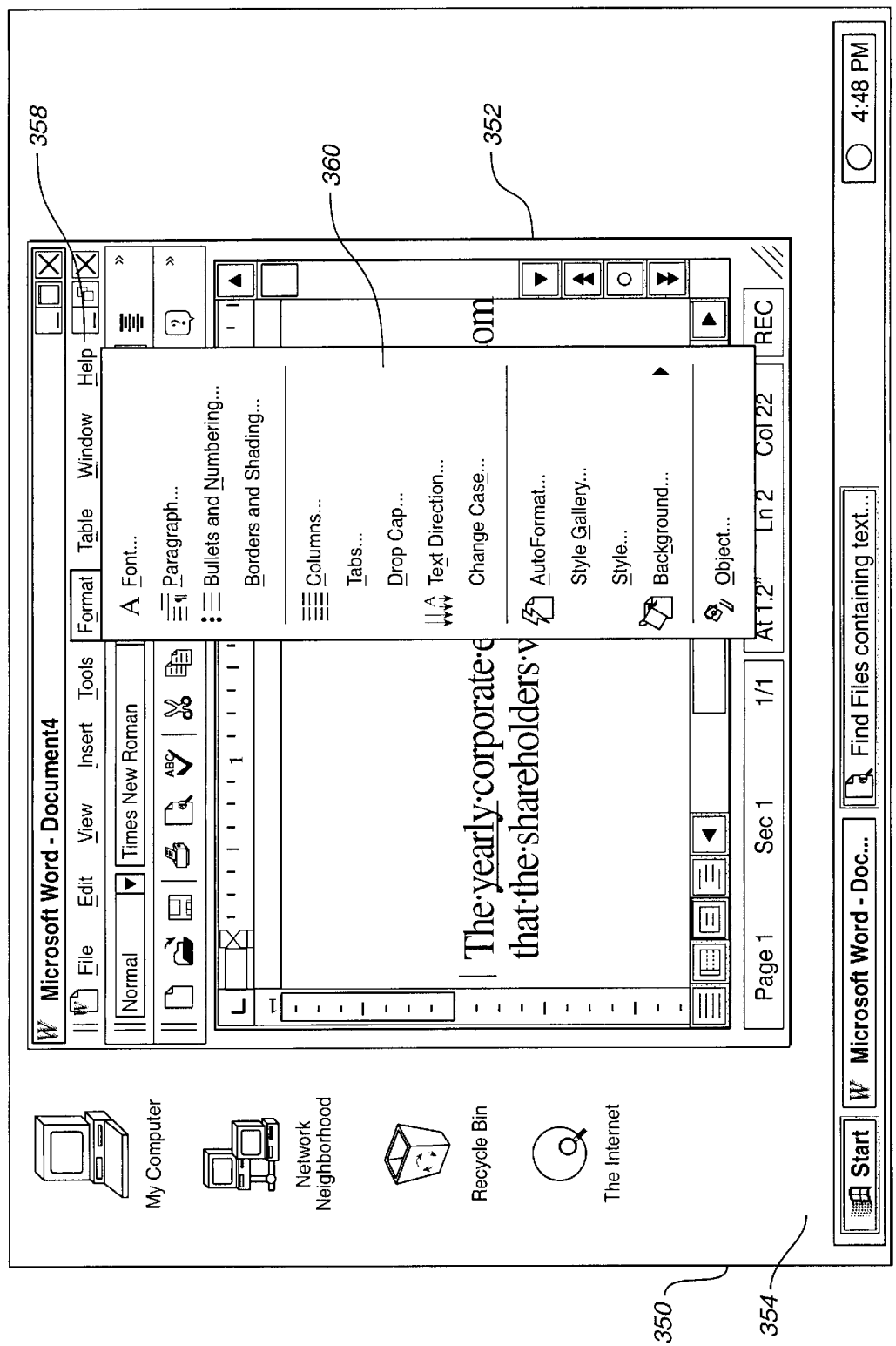
FIG._23

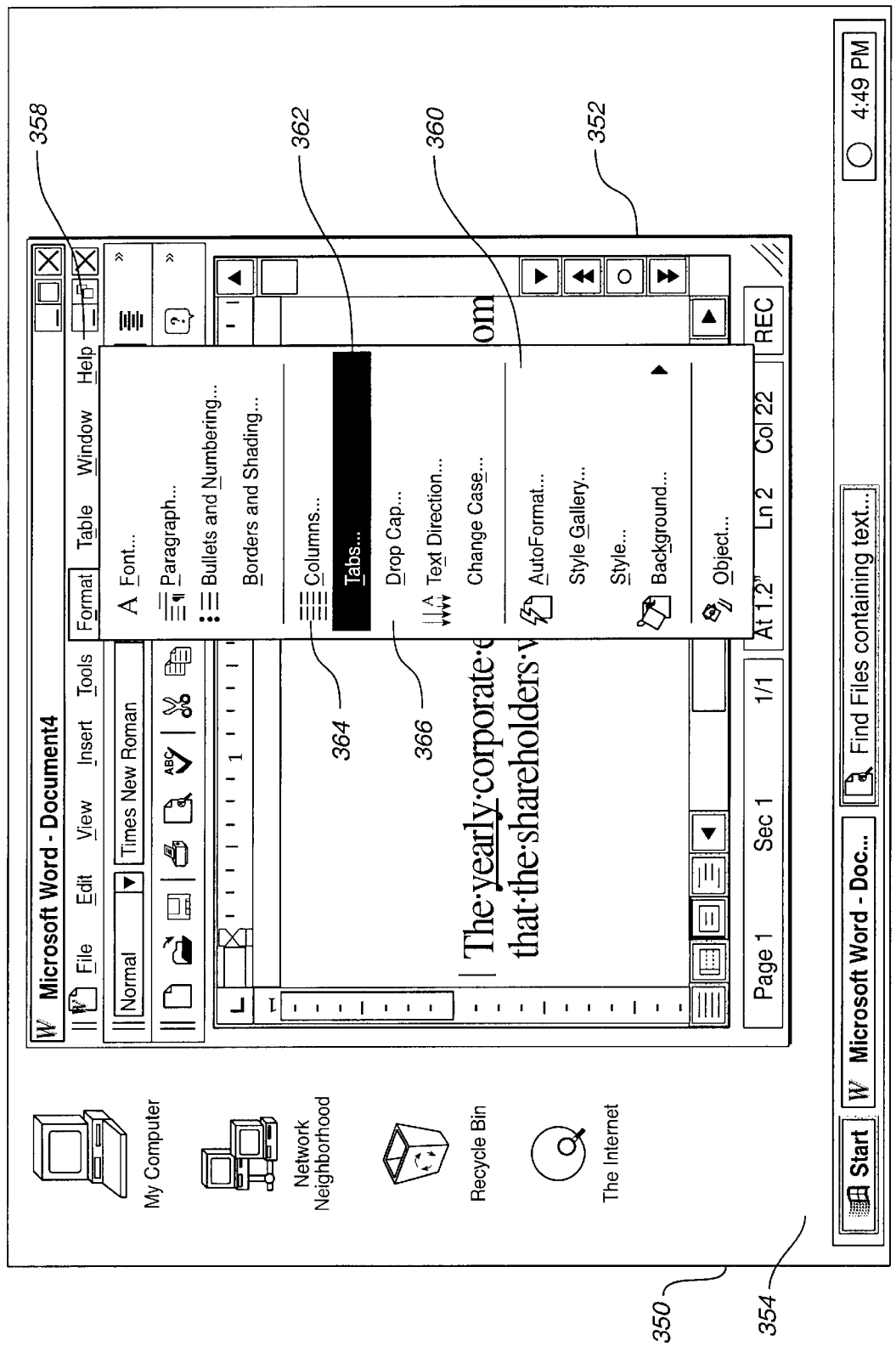
FIG._24

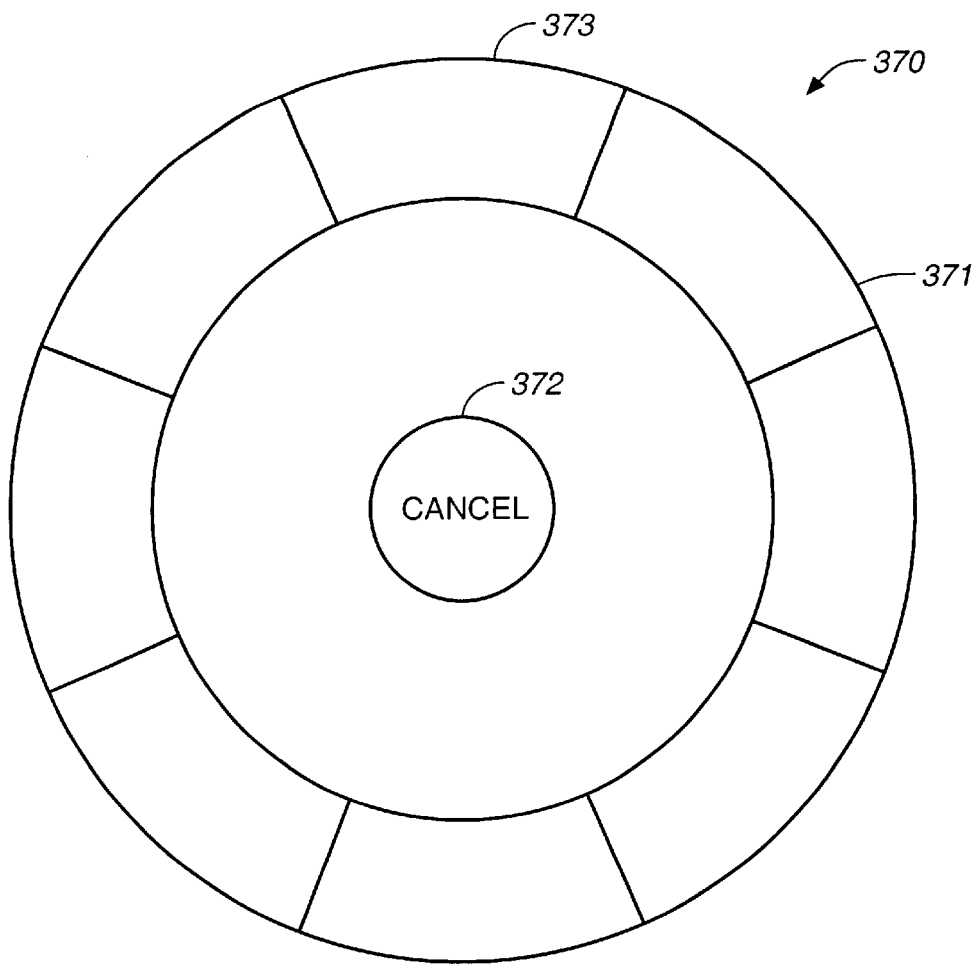
FIG._25
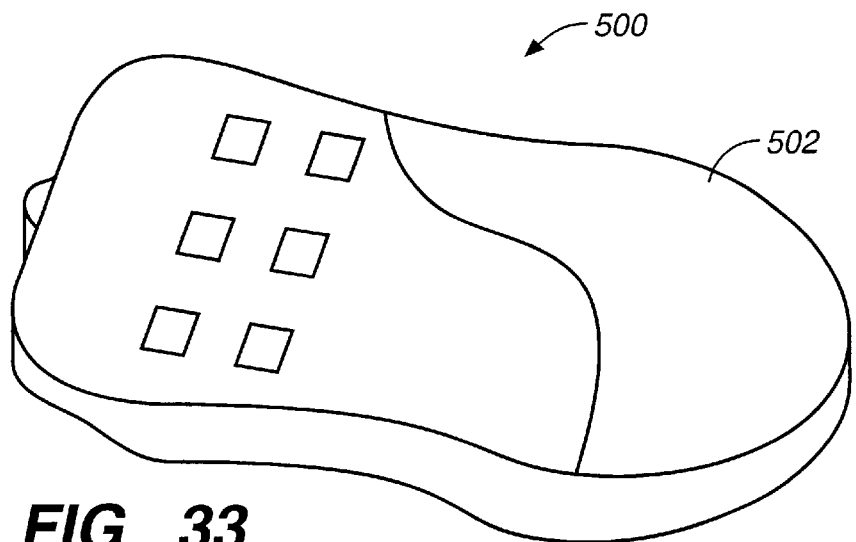
FIG._33

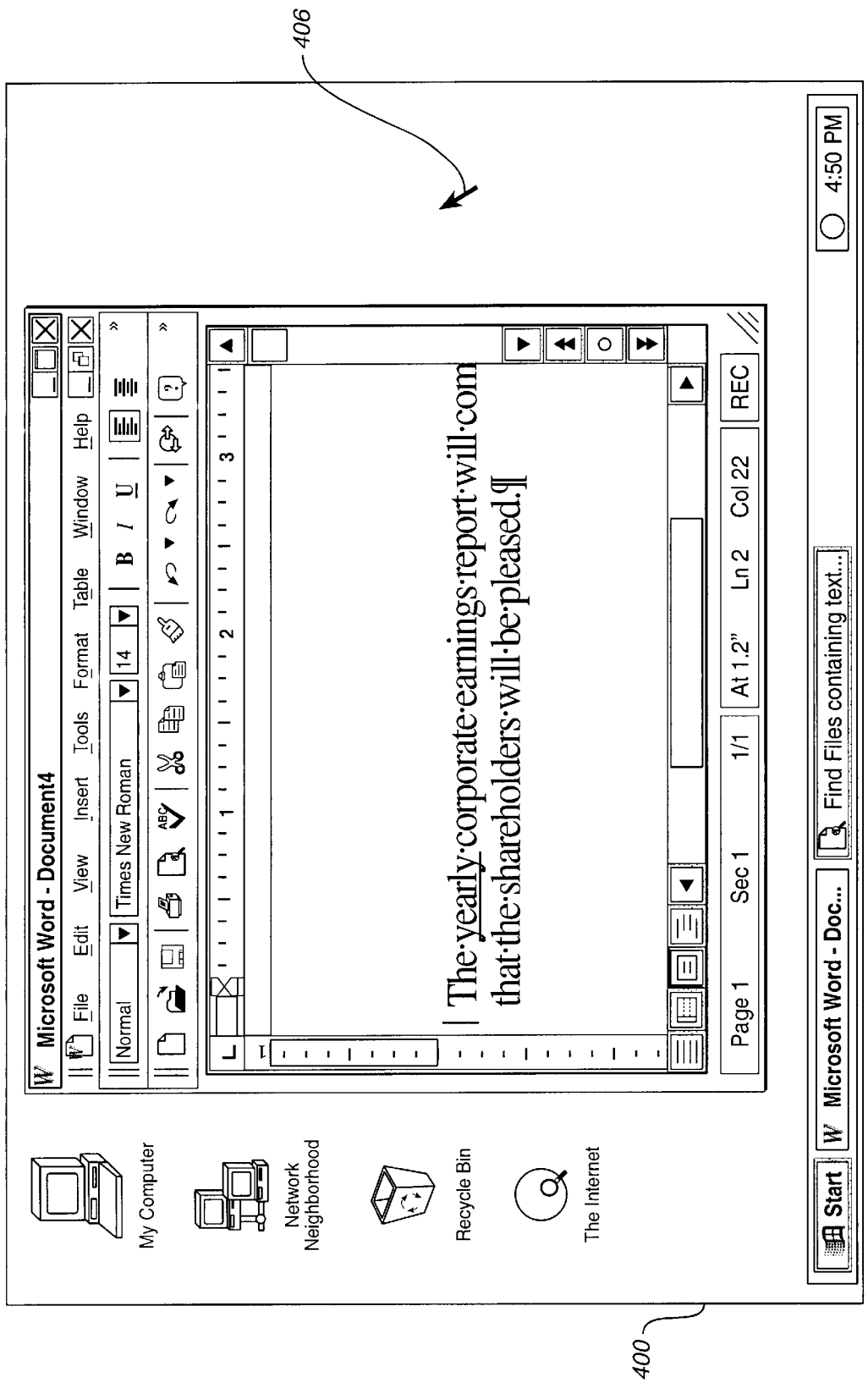
FIG._26A

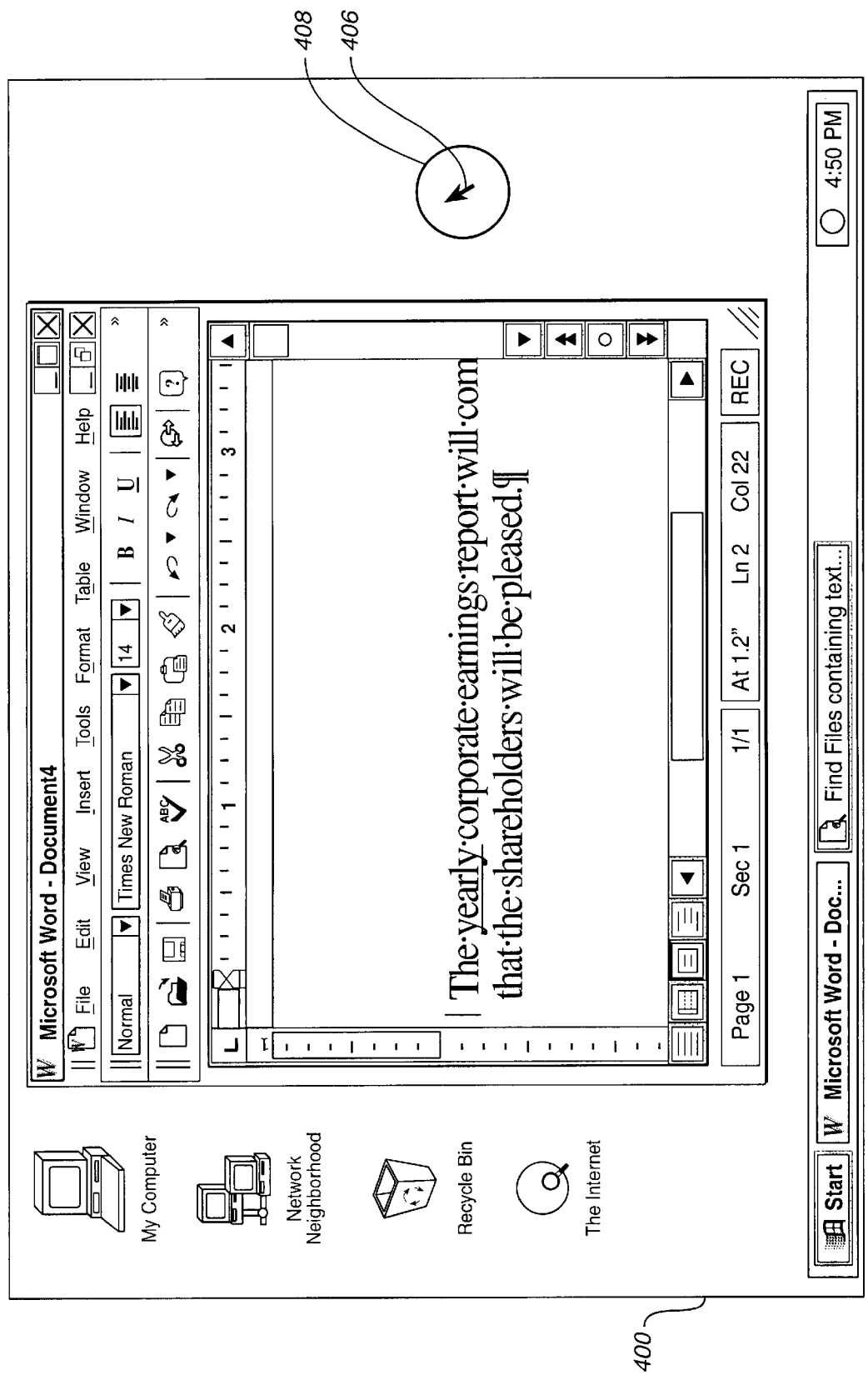
FIG._26B

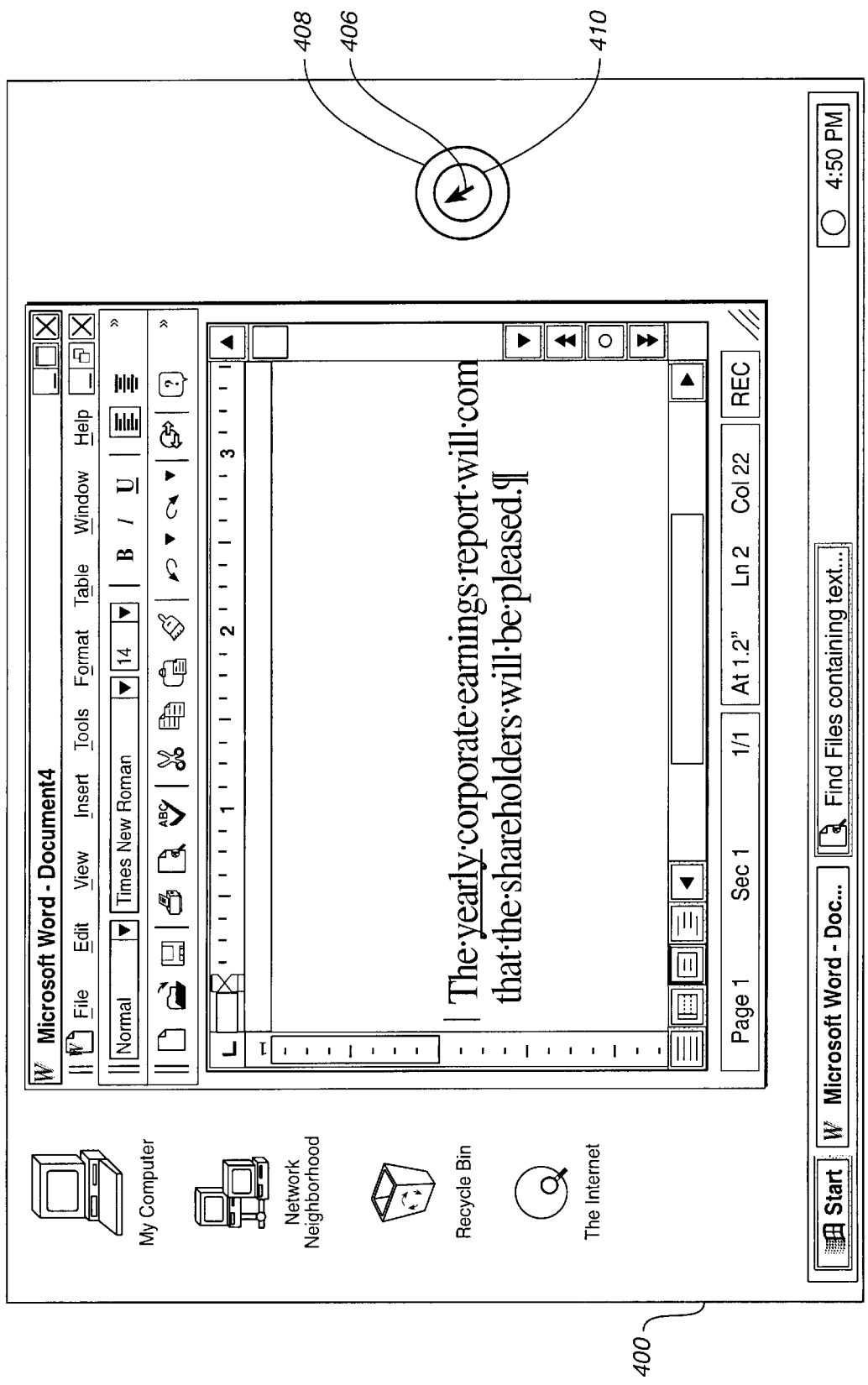
FIG._26C

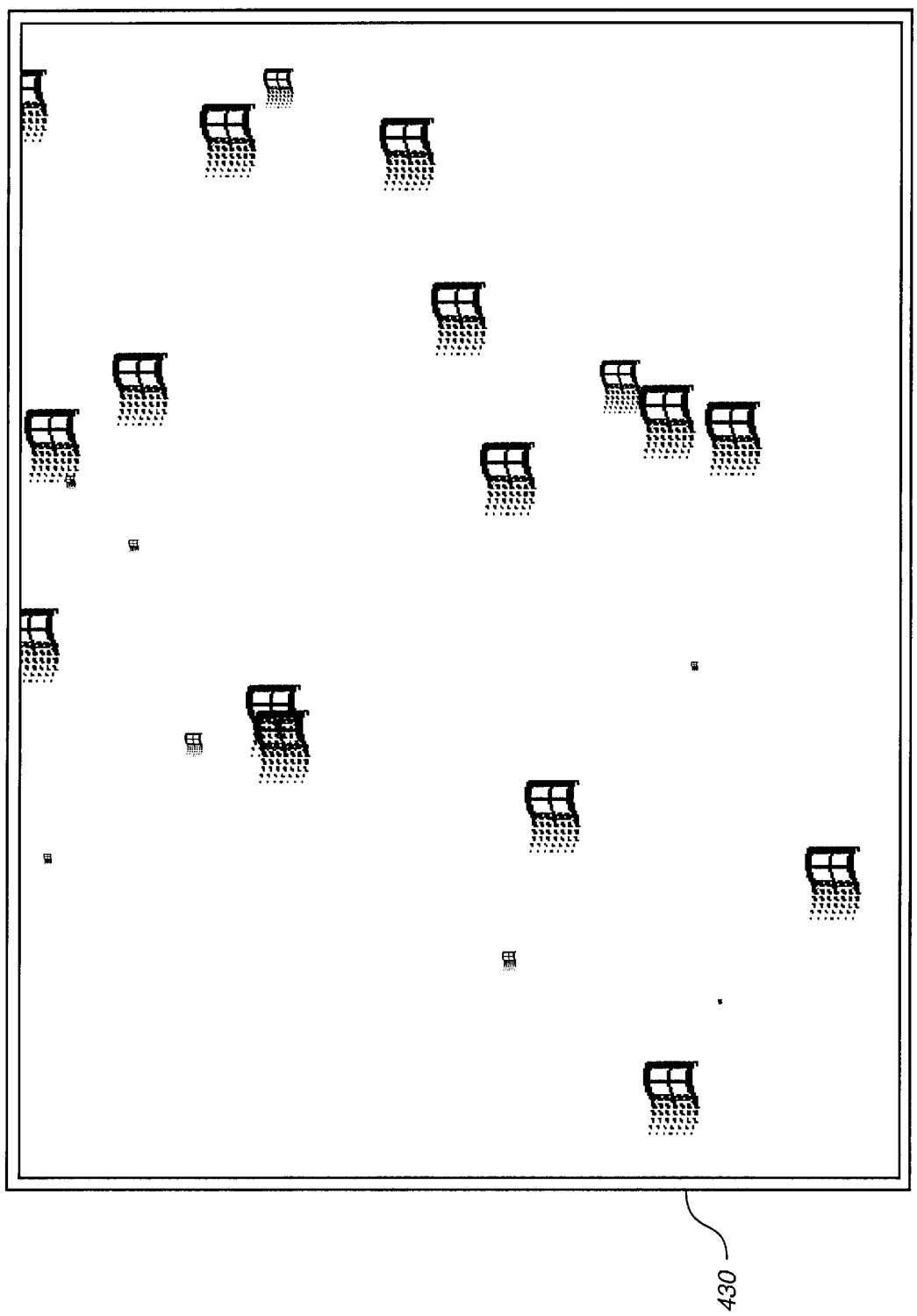
FIG._27

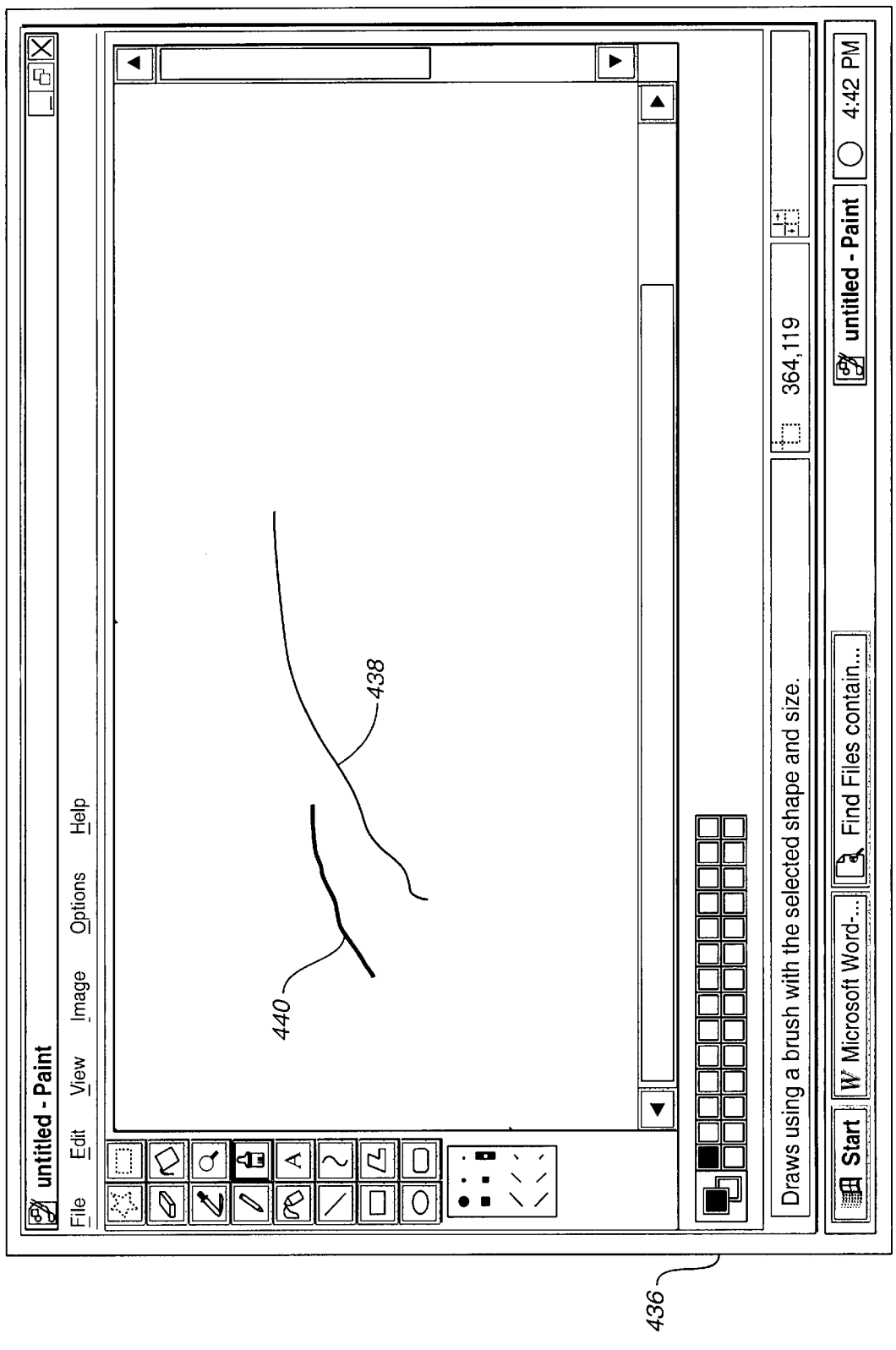
FIG._28

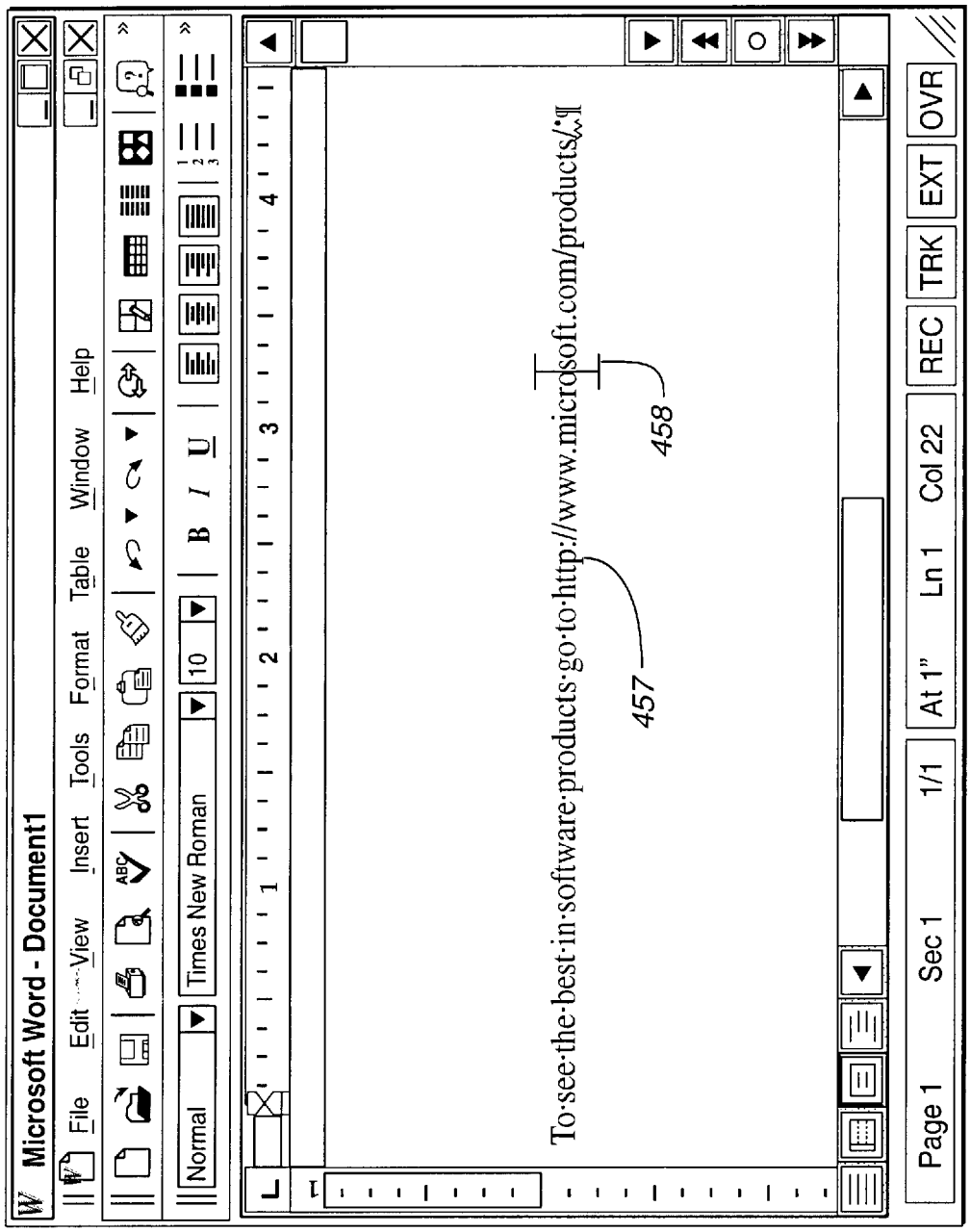
FIG._29

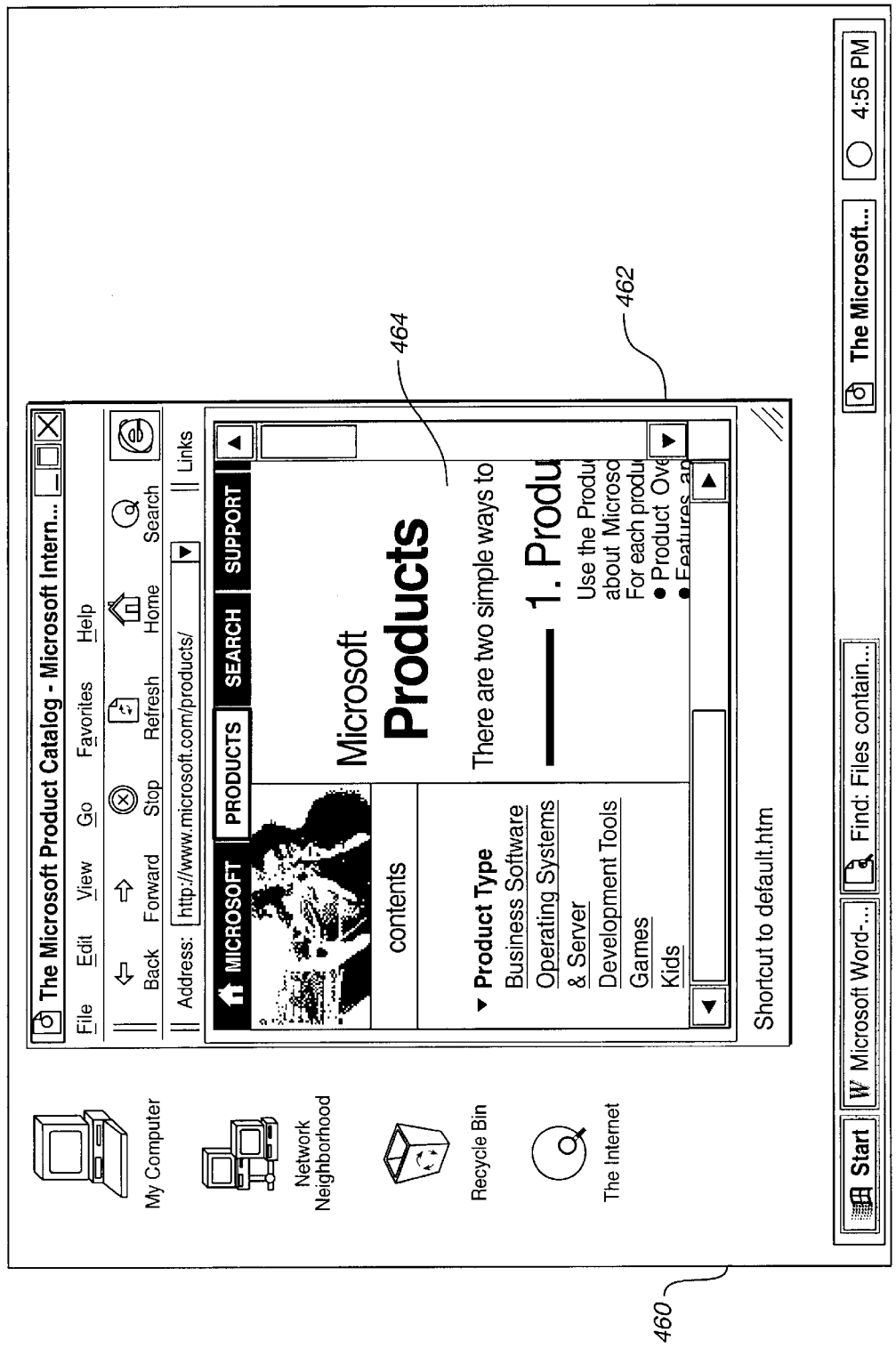
FIG._30

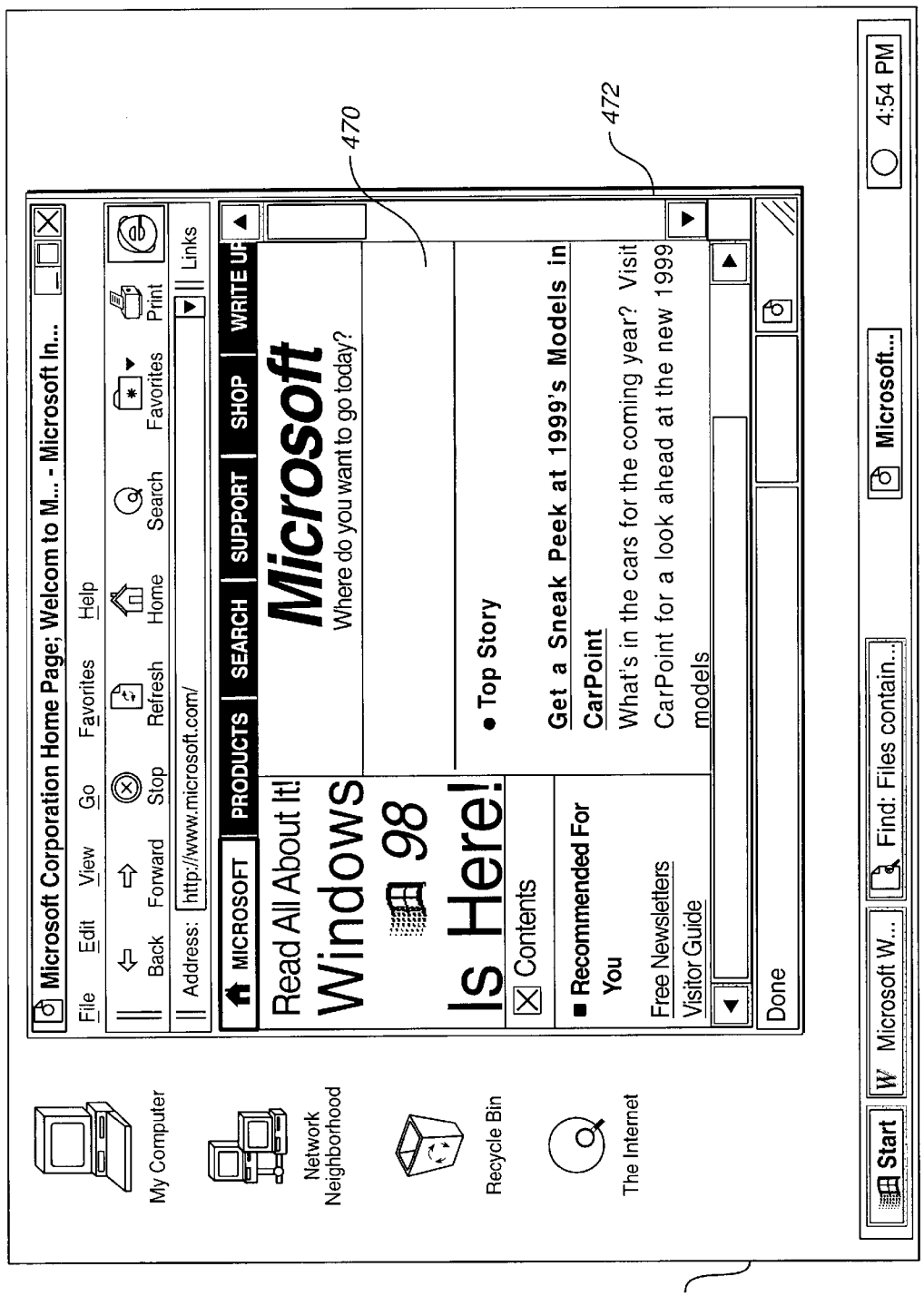
FIG._31

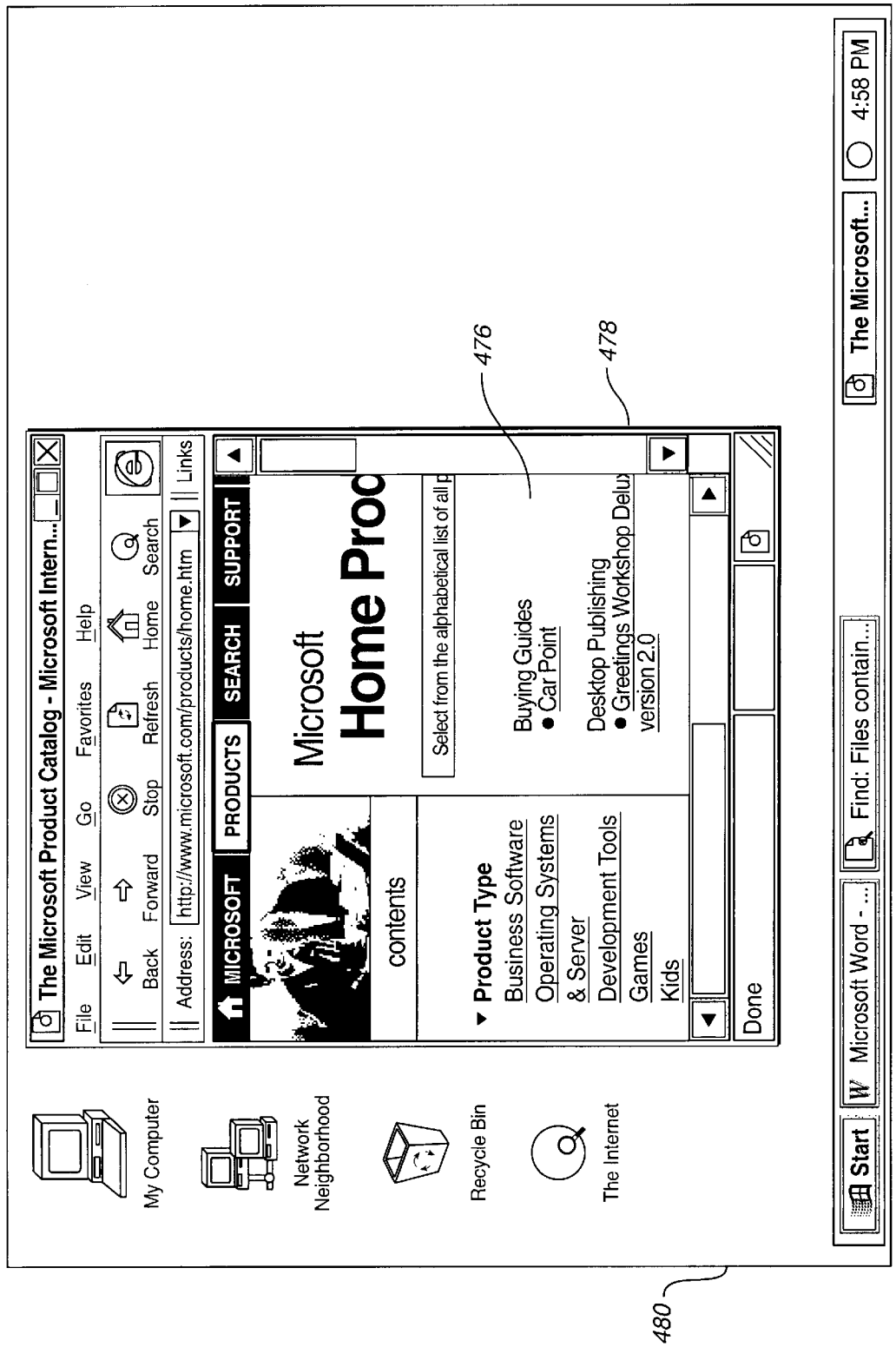
FIG._32

PROXIMITY SENSOR IN A COMPUTER INPUT DEVICE

REFERENCE TO RELATED APPLICATIONS

The present application is related to a U.S. patent application filed on even date herewith entitled "METHOD OF INTERACTING WITH A COMPUTER USING A PROXIMITY SENSOR IN A COMPUTER INPUT DEVICE", identified by attorney docket number M61.12-00095, having U.S. Ser No. 09/152,443, filed on Sep. 14, 1998, and currently pending. The present invention is also related to a U.S. patent application filed on even date herewith entitled "A TECHNIQUE FOR IMPLEMENTING A TWO-HANDED DESKTOP USER INTERFACE FOR A COMPUTER". The present application is also related to a U.S. patent application filed on even date herewith entitled "INPUT DEVICE WITH FORWARD/BACKWARD CONTROL", identified by attorney docket number M61.12-0083, having U.S. Ser. No. 09/153,148, filed on Sep. 14, 1998, and currently pending.

BACKGROUND OF THE INVENTION

The present invention relates to computerized systems. In particular, the present invention relates to input devices for computerized systems.

Computerized systems receive input signals from input devices such as keyboards, mice, joysticks, game pads, touch pads, track balls, and headsets. These input devices create input signals using touch sensors, transducers, or switches. Switches are typically found in the buttons of mice, joysticks, ard game pads, as well as in the keys of keyboards. Transducers are found in mice and track balls and create electrical signals based on the movement of balls in those devices. Transducers are also found in headsets where they convert speech signals into electrical signals. Touch sensors are found in touch pads and provide an electrical signal when the user contacts the touch pad that includes the location within the touch pad where contact was made.

Although it is desirable to increase the amount of information that an input device can provide to the computer, the number of transducers and switches that can be added to an input device is limited by the user's ability to remember all of the functions that a particular transducer or switch performs. In addition, the number of transducers and switches that can be added to an input device is limited by the average user's dexterity and their physical ability to manipulate the added controls.

SUMMARY OF THE INVENTION

An input device for a computer system includes an exterior surface and a touch sensor located on the exterior surface. The touch sensor is adapted to generate an electrical signal when a user touches the touch sensor. The electrical signal contains touch information that is the same each time the user touches the touch sensor regardless of where the user's touch occurs on the touch sensor. The input device also includes an input generator capable of generating input information sent to the computer system. The input information includes at least a depressible key's state, a depressible button's state, sound information, or movement information.

In the various embodiments, the input device can include a mouse, a keyboard, a joystick, a game pad, a headset, a remote control for an Internet set-top system, and a remote control for a television.

In various other embodiments, multiple touch sensors are located on an input device in a variety of locations. In some embodiments, the multiple touch sensor provide sufficient information to indicate how the user is holding the input device and with which hand the user is holding the input device.

BRIEF DESCRIPTION OF THE DRAWINGS

FIG. 1 is a block diagram of a computer system of the present invention.

FIG. 2 is a more detailed block diagram of one embodiment of an input device of the present invention.

FIG. 3 is a perspective view of a headset of the present invention.

FIG. 4A is a perspective view of a mouse of the present invention.

FIG. 4B is a bottom view of the mouse of FIG. 4A.

FIG. 4C is a perspective view of a circuit board of the mouse of FIG. 4A.

FIG. 5 is a top view of another embodiment of a mouse of the present invention.

FIG. 6A is a left side view of another embodiment of a mouse of the present invention.

FIG. 6B is a left side view of another embodiment of a mouse of the present invention.

FIG. 6C is a right side view of another embodiment of a mouse of the present invention.

FIG. 6D is a right side view of another embodiment of a mouse of the present invention.

FIGS. 7A and 7B are a left side view and a top view, respectively, of another embodiment of a mouse of the present invention.

FIGS. 8A and 8B are a left side view and a top view, respectively, of another embodiment of a mouse of the present invention.

FIGS. 9A, 9B and 9C are a left side view, a top view, and a right side view, respectively, of another embodiment of a mouse of the present invention.

FIGS. 10A, 10B, 10C, 10D, 10E, 10F, 10G, and 10H, are top views of different embodiments for a mouse button under the present invention.

FIG. 11A is a top view of another embodiment of a mouse under the present invention.

FIG. 11B is a top view of another embodiment of a mouse under the present invention.

FIGS. 12A and 12B are right side views of different embodiments of mice under the present invention.

FIGS. 13A, 13B, 13C, and 13D are left side views of different embodiments of mice under the present invention.

FIGS. 14A, 14B, 14C, and 14D are top views of different embodiments of mice under the present invention showing touch sensor proximate a wheel on a mouse.

FIG. 15 is a perspective view of a track ball of the present invention.

FIG. 16 is a perspective view of a joystick of the present invention.

FIG. 17 is a perspective view of a game pad of the present invention.

FIG. 18 is a perspective view of a keyboard of the present invention.

FIG. 19 is a more detailed block diagram of the computer of FIG. 1.

FIG. 20 is a screen display as it appears before an input device of the present invention is touched.

FIG. 21 is an image of a screen display after an input device of the present invention has been touched.

FIG. 22 is an image of a screen display showing a pull-down menu activated through the present invention.

FIG. 23 is an image of a screen display showing a second pull-down menu opened through the present invention.

FIG. 24 is an image of a screen display showing an item selected in a pull-down menu through the process of the present invention.

FIG. 25 is an image of a screen display showing a radial menu.

FIGS. 26A, 26B, 26C, show animation around a cursor in response to an input device of the present invention being touched.

FIG. 27 is an image of a screen saver.

FIG. 28 is an image of a screen display showing ink trails of different widths produced by the input device of the present invention.

FIG. 29 is an image of a screen display showing a cursor in a hypertext link.

FIG. 30 is an image of a screen display showing a web browser that includes a current page.

FIG. 31 is an image of a screen display showing a web browser that includes a past page.

FIG. 32 is an image of a screen display showing a web browser that includes a next-page.

FIG. 33 is a top view of an Internet set-top remote control.

DETAILED DESCRIPTION OF ILLUSTRATIVE EMBODIMENTS

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and. writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and device driver 60. The device driver process commands and information entered by a user through an input device 43, which can include a keyboard, a pointing device, a microphone, a headset, a track ball, a joystick, a game pad, or the like. Under the present invention, at least one of the input devices includes both a touch sensor 40 and a movement transducer 42. Touch sensor 40 is capable of generating a signal that indicates when the user is touching the input device. Movement transducer 42 is capable of generating a signal that indicates when a user causes part of the input device to move. The signals generated by touch sensor 40 and movement transducer 42 are passed along a conductor connected to the processing unit 21 through a serial port interface 46 that is coupled to the system bus 23, but may be connected by other interfaces, such as a sound card, a parallel port, a game port or a universal serial bus (USB).

A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

FIG. 2 is an expanded block diagram of a portion of one embodiment of an input device 43 of FIG. 1. Input device 43 includes an array of four touch sensors 100, 102, 104, and 106. Each of the sensors produces an electrical signal along a respective conductor 108, 110, 112, and 114, which are connected to an analog-to-digital converter and multiplexer 116. Touch sensors 100, 102, 104, and 106, generate their electrical signals based on actual contact between the user and a portion of the sensor or based on extreme proximity between the user and the sensor. Those touch sensors that rely on contact are referred to as contact sensors and those that rely on proximity are referred to as proximity sensors. In the context of this application, a touch sensor is touched when it is contacted in the case of contact sensors or when the user is sufficiently proximate the sensor in the case of proximity sensors.

In some contact sensor embodiments, a touch sensor includes a conductive film available from ChemTronics that has a capacitance that changes when it is touched. This sensor also includes a capacitive measuring circuit that generates an electrical signal based on the change in capacitance of the conductive film. Those skilled in the art will recognize that other contact sensor technologies are available such as photodiodes, piezoelectric materials, and capacitive pressure sensors. Any of these sensors may be used within the context of the present invention. In one proximity sensor embodiment, the touch sensor uses reflected light from an LED to detect when the user is proximate the sensor. A chip used to drive the LED and sense the reflected light under this embodiment is produced by Hamamatsu Corporation of Bridgewater, New Jersey. Other proximity sensor embodiments use changes in electric or magnetic fields near the input device to determine when the user is proximate the device.

In embodiments of the present invention, the touch sensors provide the same information regardless of where on the touch sensor the user touches the input device or the portion of the sensor that the user is proximate. Thus, a given touch sensor does not provide location information that would indicate where the user made contact within that touch sensor or where the user came closest to the touch sensor within the touch sensor. Thus, under the present invention, the touch sensors decouple touch data from position data.

This distinguishes the present invention from touch pads, touch screens and touch tablets of the prior art. In all of these prior devices, one cannot specify positional data without touching the device, nor can one touch the device without specifying a position. Hence, touch sensing and position sensing are tightly coupled in these prior devices.

Analog-to-digital converter and multiplexer 116 converts the analog electrical signals found on conductors 108, 110, 112, and 114, into digital values carried on a line 118. Line 118 is connected to microcontroller 120, which controls multiplexer 116 to selectively monitor the state of the four touch sensors. Microcontroller 120 also receives inputs from various other sensors on the input device. For simplicity, these inputs are shown collectively as input 122. Those skilled in the art will recognize that different input devices provide different input signals depending on the types of motion sensors in the input device. Examples of motion sensors include switches; which provide signals indicative of the motion needed to close a switch; microphones, which provide signals indicative of air movement created by an audio signal; encoder wheels, which provide signals indicative of the motion of a mouse ball, track ball, or mouse wheel; and resistance wipers, which provide electrical signals indicative of the movements of a joystick. Each of these motion sensors acts as an input generator that is capable of generating input information to be sent to the computer system. Based on the particular input generator, this input. information can include a depressible key's state, a depressible button's state, sound information, or movement information.

Those skilled in the art will also recognize that the number of input lines tied to microcontroller 120 depends on the number of sensors on the input device and the configuration of the input device. For example, for a keyboard, the microcontroller uses input lines to determine if any of the keys have been depressed. The microcontroller accomplishes this using a multiplexer (not shown) to sequentially test the state of each key on the keyboard. The techniques used to detect these switch closures are well known in the keyboard art.

In a mouse or track ball, input lines 122 include lines for detecting the closure of switches and lines for detecting the rotation of encoder wheels. The switches are located beneath buttons on the mouse or tack ball. The encoder wheels track the movement of the mouse ball or track ball. Typically, one encoder wheel tracks movement in the X direction and another encoder wheel tracks movement in the Y direction. In most embodiments, each encoder wheel has its own associated input line into microcontroller 120. In some mice, an additional encoder wheel tracks the rotation of a wheel located on top of the mouse.

In some mice, the X and Y movement of the mouse is tracked by a separate optics microcontroller that is connected to microcontroller 120 through lines 122. The optics microcontroller uses optical data to determine movement of the mouse. The optical microcontroller converts this optical data into movement values that are transmitted to microcontroller 120 along input lines 122.

In a game pad, input lines 122 include lines for detecting the closure of multiple switches on the game pad as well as lines for detecting the rotation of wheels on the game pad. In joysticks, input lines 122 can include lines connected to resistance wipers on the joystick as well as switches on the joystick. In headsets, lines 122 include multiple lines that carry multi-bit digital values indicative of the magnitude of the analog electrical signal generated by the microphone. These digital values are typically produced by an analog-to-digital converter. To reduce the weight of the headset, the analog-to-digital converter and microcontroller 120 are often found on a soundboard located within the computer. To further reduce the weight of the headset, multiplexer and A-to-D converter 116 of FIG.2 can also be implemented on the soundboard.

Microcontroller 120 produces an output 124, which is provided to serial port interface 46 of FIG. 1. Typically, output 124 is a serial, digital value that indicates which motion sensor or touch sensor has been activated. For keyboards, the digital values include scan codes that uniquely identify the key or touch sensor on the keyboard that has been activated. For mice, the digital values include a mouse packet that describes the current state of each switch and each touch sensor on the mouse as well as the distances that the mouse wheel and mouse ball have moved since the last mouse packet was sent.

FIG. 3 is a perspective view of a headset 150 of the present invention. Headset 150 includes a microphone 152, a support piece 154, a touch sensor 156, and an output line 158. Support piece 154 is designed to loop around a user's ear to support the headset such that microphone 152 positioned in front of the user's mouth.

Output line 158 carries signals from microphone 152 and from touch sensor 156. In some embodiments, headset 150 is connected to a computer system that includes a speech recognition system. In these embodiments, the speech recognition system is inactive unless touch sensor 156 indicates that headset 150 is being touched by a user. The activation of the speech recognition system can include loading the speech recognition system into random access memory when the user first touches headset 154. It can also include prompting a speech recognition system that resides in random access memory so that it can process input speech signals. In either case, by only activating the speech recognition system when headset 150 indicates that the user is touching the headset, the present invention reduces the likelihood that extraneous speech will be processed by the speech recognition system.

FIG. 4A is a perspective view of one embodiment of a mouse 170 of the present invention. Mouse 170 includes a palm-rest 172, a left button 174, a right button 176, a wheel 178, a side 180, and an output line 182. Palm-rest 172, left button 174, and two side areas 184 and 186 of side 180 are coated with S separate conductive films. Each of the conductive films is connected to and forms part of a separate sensor such as sensor 100, 102, 104, and 106 of FIG. 2.

FIG. 4B shows a bottom view of mouse 170. Mouse 170 includes a track ball 190 located in a track ball nest 192. When mouse 170 is moved across a surface through force applied at palm-rest 172, side 180, left button 174, or right button 176, track ball 190 rolls within nest 192. This rolling is detected by a pair of encoder wheels 194 and 196 that are shown in FIG. 4C FIG. 4C is a perspective view of some of the internal electronics 189 of mouse 170. In FIG. 4C, track ball 190 has been omitted for clarity. Internal electronics 189 include encoder wheels 194 and 196 that detect movements of track ball 190 along two perpendicular directions. The encoder wheels produce electrical signals that are provided to microcontroller 200, which also receives inputs from switches 202 and 204 located under left button 174 and right button 176, respectively. Switches 202 and 204 indicate when left button 174 and right button 176, respectively, have been depressed by the user. Microcontroller 200 also receives signals from switch 201, which indicate when wheel 178 has been depressed, and an encoder wheel 203, which indicates rotational movement of wheel 178. Microcontroller 200 also receives electrical signals from the four sensors attached to the conductive films on palm-rest 172, left button 174, and side areas 184 and 186 of FIG. 4A. These four sensors are grouped together in FIG. 4C as sensor array 206.

Thus, the mouse of the present invention is able to detect when certain areas of the mouse are being touched and when portions of the mouse or the entire mouse are being moved. Specifically, the conductive films at palm-rest 172, left button 174, and side areas 184 and 186 indicate when these areas are being touched by the user. Note that even if the user does not move the mouse or press a button, the sensors associated with the conductive films of FIG. 4A will generate an electrical signal when the user touches the mouse. Encoder wheels 194 and 196 generate a separate electrical signal when the user moves the mouse and switches 202, 204, and 201 generate separate electrical signals when the user depresses buttons 174 and 176, and wheel 178 respectively. Thus, the mouse of the present invention adds functionality without increasing dexterity needed to manipulate the controls of the mouse.

In alternative embodiments of the present invention, track ball 190 and encoder wheels 194 and 196 are replaced by a solid-state position-tracking device that collects images of the surface that the mouse travels over to determine changes in the position of the mouse. Under these embodiments, the mouse typically includes a light source used to illuminate the surface, an optics system used to collect images of the surface, and a processor used to compare the various images to determine if the mouse has moved, and if so, in what direction. Since the solid-state position-tracking device converts movement into an electrical signal, it can be considered to be a sophisticated transducer or motion sensor.

FIGS. 5, 6A, 6B, 6C, 6D, 7A, 7B, 8A, 8B, 9A, 9B, 9C, 10A, 10B, 10C, 10D, 10E, 10F, 10G, 10H, 11A, 11B, 12A, 12B, 13A, 13B, 13C, 13D, 14A, 14B, 14C, and 14D show alternative configurations for a mouse under the present invention. FIG. 5 is a top view of a mouse that only has a touch sensor on its palm rest 600. FIGS. 6A, and 6B, show separate mice embodiments that each have a sensor at the palm-rest and along the left side of the mouse. In FIG. 6A, which is a side view, a single sensor 602 covers both the palm rest and the left side of the mouse. In FIG. 6B, also a side view, one sensor covers a palm rest 604 and a separate sensor covers a left side 606.

FIGS. 6C and 6D show separate mice embodiments of the present invention that each has a sensor at the palm rest and along the right side of the mouse. In FIG. 6C, which is a right side view, a single sensor 603 covers both the-right side and the palm rest. In FIG. 6D, also a right side view, one sensor 605 covers the palm rest and a separate sensor 607 covers the right side.

FIGS. 7A and 7B show a side view and a top view, respectively, of a mouse embodiment having a single sensor 608 across a palm rest and a left side of the mouse, and a separate sensor 610 on the left button of the mouse. FIGS. 8A and 8B show a side view and a top view, respectively, of a mouse embodiment having a single touch sensor 612 across the palm rest and left side of the mouse, a touch sensor 614 on the left button of the mouse and a touch sensor 616 on the right button of the mouse.

FIGS. 9A, 9B, and 9C show a left side view, a top view and a right side view, respectively, of a mouse 690 of the present invention. Mouse 690 includes a left side sensor 692, a palm sensor 694, a right side sensor 696, and a button sensor 698. In mouse 690, right side sensor 696 and left side sensor 692 are separate from palm sensor 649. In another embodiment of the present invention these three sensors are formed as a single sensor.

FIGS. 10A, 10B, 10C, 10D, 10E, 10F, 10G and 10H show top views of different mice embodiments showing possible configurations for touch sensors on the left button of a mouse of the present invention. These button configurations may appear alone on the mouse or in combination with other sensors on other parts of the mouse. FIG. 10A shows a single solid sensor 618 across the entire left button. FIG. 10B shows a set of six sensor strips 620 that each produce a separate electrical signal when they are touched. FIG. 10C shows two regions 624 and 626 separated by a ridge 628. Both region 624 and 626 end at a front end 627 of button 622. FIG. 10D shows two regions 634 and 637 separated by a ridge 636, where regions 634 and 637 both end at a side end 631 of button 630. The configurations of buttons 622 and 630 are particularly useful in paging through documents as discussed below. FIG. 10E shows a button configuration for a button 640 having four separate sensor areas formed as squares 641, 642, 643, and 644. In some embodiments, the lines that separate the four sensor areas are formed as ridges that have a different topography from the sensor areas. FIG. 10F also shows four separate sensors on a button 646. In FIG. 10F three of the sensor areas 650, 651, and 652 are found at a front end of button 646, and the remaining sensor 648 covers the remainder of button 646. FIG. 10G shows a button 660 with nine sensor regions arranged in a layout similar to a keypad. FIG. 10H shows a button 670 with an outer circle of eight sensors 672 that surrounds a central sensor 674. The configuration of button 670 is especially useful for manipulating radial menus.

FIGS. 11A and 11B show mice embodiments that include separate sensors on both buttons of the mouse.

In FIG. 11A, buttons 700 and 702 have sensors but palm rest 704 does not have a sensor. In FIG. 11B, buttons 706 and 708 and palm rest 710 each has separate sensors.

FIGS. 12A and 12B show mice embodiments with multiple sensors along the right side of the mouse. In FIG. 12A, which is a right side view, there are two sensors 720 and 722 along the right side. In FIG. 12B, there are three sensors 724, 726, and 728 along the right side.

FIGS. 13A, 13B, 13C, and 13D show side views of mice embodiments with multiple sensors along the left side of the mouse. The mouse of FIG. 13A has two sensors 734 and 736 along the left side. In FIG. 13B, the mouse has three touch sensors 738, 740, and 742, each separated by a space. The mouse of FIG. 13C also has three touch sensors along the left side. However, in FIG. 13C, middle touch sensor 744, which is located between sensors 746 and 748, has a raised surface and is formed as a ridge between sensors 746 and 748. The raised surface of sensor 744 provides tactile feedback to the user to allow the user to determine the position of their thumb without looking at the mouse. FIG. 13D shows a mouse embodiment with a plurality of strips 752 running along the left side of the mouse.

Note that all of the embodiments of FIGS. 12A, 12B, 13A, 13B, 13C, and 13D can be practiced under the present invention along with a sensor located on the palm rest and/or a sensor located on the left button and/or a sensor located on the right button.

FIGS. 14A, 14B, 14C, and 14D are top views of mice embodiments with touch sensors proximate a wheel on a mouse. In FIG. 14A, the touch sensor is located directly on a wheel 760. In FIG. 14B, one touch sensor 762 is located forward of a wheel 764, and one touch sensor 766 is located in back of wheel 764. In the embodiment of FIG. 14B, wheel 764 does not have a touch sensor. In FIG. 14C, one touch sensor 770 is located in front of a wheel 768 and one touch sensor 772 is located in back of wheel 768. In addition, wheel 768 includes a touch sensor. In the embodiment of FIG. 14D, touch sensors are located on a wheel 774, front area 776, which is in front of wheel 774, back area 778, which is in back of wheel 774, and palm rest 780.

Although various embodiments have been described with particularity with respect to touch sensor location in FIGS. 5, 6A, 6B, 6C, 6D, 7A, 7B, 8A, 8B, 9A, 9B, 9C, 10A, 10B, 10C, 10D, 10E, 10F, 10G, 10H, 11A, 11B, 12A, 12B, 13A, 13B, 13C, 13D, 14A, 14B, 14C, and 14D, it should be noted that sensors may also be included in other locations. For example, it is possible to combine some or all of the touch sensors illustrated in one embodiment with some or all of the touch sensors illustrated in another embodiment.

FIG. 15 is a perspective view of a track ball 220 of the present invention. Track ball 220 includes a base 222, buttons 224 and 226, and a ball 228. In one embodiment of the present invention, track ball 228 is coated with a conductive film that is contacted by three rotating metal wheels (not shown) in base 222. One of the metal wheels is contacted by a conductive sheet that sits behind the wheel and is pressed into the wheel by a spring force. The conductive sheet is further connected to a touch sensor that produces an electrical signal when track ball 228 is touched by a user. The other two wheels in base 222 form two orthogonal motion sensors (not shown) capable of tracking the rotary motion of track ball 228 in base 222. Beneath buttons 224 and 226, base 222 includes two switches that are capable of generating electrical signals when a user depresses buttons 224 and 226. Thus, track ball 220 is able to provide one electrical signal based on the user simply touching ball 228 and separate electrical signals based on the user moving track ball 228-or depressing buttons 224 or 226.

FIG. 16 is a perspective view of a joystick 240 of the present invention that includes a base 242, a handle 244, a trigger 246, and buttons 248, 250, and 252. In one embodiment of the present invention, trigger 246 is coated with a conductive film that is connected to a touch sensor within base 242. In further embodiments, button 248 is also coated with a conductive film connected to a separate touch sensor in base 242. Trigger 246 and buttons 248, 250, and 252 are further connected to switches that provide respective electrical signals when the user depresses the respective buttons or trigger. Handle 244 is connected to a set of transducers that track the relative motion of handle 244 relative to base 242. Thus, joystick 240 provides a set of electrical signals when the user is touching trigger 246 or button 248 and a separate set of electrical signals when the user moves handles 244 or moves trigger 246 or buttons 248,250, or 252.

FIG. 17 is a perspective view of a game pad 260 of the present invention having side buttons 262 and 264, left hand buttons 266, 268, 270, 272, 274, and 276 and right hand buttons 278, 280, 282, 284, 286, and 288. In addition, game pad 260 has a start button 290 and a select button 292. In some embodiments of the present invention, side buttons 262 and 264 are each coated with a conductive film that is connected to a respective touch sensor within game pad 260. Game pad 260 also includes a plurality of switches, one switch for each button on the game pad. Thus, in some embodiments, game pad 260 is able to provide one set of signals indicative of when the user is touching side buttons 262 and 264 and a second set of electrical signals indicative of when the user has depressed a button on game pad 260.

FIG. 18 depicts a keyboard 300 of one embodiment of the present invention that has a typical QWERTY layout 302 on the left side of the keyboard and a numeric keypad 304 on the right side. Numeric keypad 304 includes the numbers 0–9 with the numbers 1–9 appearing in a 3×3 box. In some embodiments, all nine of these keys are covered with a conductive film.

In other embodiments, other keys on the keyboard are covered by the conductive film. The conductive film on each key is connected to and forms part of a separate touch sensor in keyboard 300. The application of such touch sensors in the present invention is discussed further below. The fact that each key has a conductive film means that the keys are each able to provide two signals. One signal is provided when the user touches but does not depress the key and a second signal is provided when the user depresses the key.

Additional touch sensors are located on keyboard casing 301 at palm rest portions 306 and 307 below space bar 308, at palm rest portion 309 below arrow keys 310, and at a palm rest portion 311 below key pad 304. Arrow keys 310 are typically used by the user to move a cursor across the display. Note that although keyboard 300 is shown with touch sensors on the keys and touch sensors on portions 306, 307, 309, and 311, other embodiments of the invention only have touch sensors on the keys or only on one of the portions 306, 307, 309, and 311. In other embodiments, different combinations of these touch sensors are found on the keyboard. In addition, some or all of the touch sensors on portions 307, 307, 309, and 311 are proximity sensors in some embodiments. The proximity sensors can detect the user's hand when it is near the sensor without requiring the hand to actually contact the sensor.

FIG. 19 is a more detailed block diagram of computer 20 useful in describing a message routing system of one embodiment of the present invention. In FIG. 19, input device 43 provides a serial binary signal to serial interface 46. Input device 43 can include any of the input devices described above-that have touch sensors.

Serial interface 46 converts the serial binary signal from input device 43 into parallel multi-bit values that are passed to device driver 60.

In many embodiments of the present invention device driver 60 is implemented as a software routine that is executed by CPU 21 of FIG. 1. In these embodiments, device driver 60 is input device specific and is designed to interact with a particular input device based on a designated protocol. Thus, if input device 43 is a mouse, device driver 60 is a mouse driver that is designed to receive mouse packets generated by the mouse using a mouse packet protocol. If input device 43 is a keyboard, device driver 60 is a keyboard driver designed to receive keyboard scan codes indicative of a key being depressed or a touch sensor being touched.

Based on the designated protocol, device driver 60 converts the multi-bit values into device messages that are passed to operating system 35. These device messages indicate what events have taken place on the input device. For example if a touch sensor on a mouse has been touched, the message indicates that the particular sensor is being touched. When the touch sensor is released, a separate message is generated by device driver 60 to indicate that the touch sensor has been released.

The messages generated by device driver 60 are provided to operating system 35, which controls the routing of these messages. Under many embodiments, the device messages are usually sent to a focus application 812. The focus application is typically the application that has the top-most window on the display.

In some embodiments of operating system 35, the operating system maintains a list of message hook procedures that have been registered with the operating system. In these embodiments, operating system 35 sequentially passes the device message to each message hook procedure on the list before sending the message to focus application 812. Such message hook procedures are shown generally as message hook procedures 810 of FIG. 19. Most message hook procedures simply evaluate the device message to determine if some action should be taken. After evaluating the device message, the message hook procedure returns a value to operating system 35 indicating that the operating system should pass the device message to the next procedure in the list. Some message hook procedures have the ability to "eat" a device message by returning a value to operating system 35 that indicates that the operating system should not pass the device message to any other message hook procedures or to the focus application.

The message hook procedures and the focus application use the device messages, especially those indicating that a touch sensor has been touched, to initiate a variety of functions that are discussed below.

For example, FIGS. 20 and 21 depict images of screens displayed by various applications of the present invention that utilize device messages generated based on signals from an input device of the present invention such as mouse 170 and track ball 220 of FIGS. 4A and 15, respectively. FIG. 20 depicts an image of a screen 320 that shows a virtual desktop 322. Virtual desktop 322 includes images of icons 324 and 326 as well as an open window 328. Open window 328 is associated with a word processing application known as Microsoft Word, offered by Microsoft Corporation of Redmond, Wash.

In Window 328, a caret 330 is positioned within a sentence of an open document. Caret 330 is may be positioned by moving mouse 170 or ball 228 of track ball 220. In FIG. 20 caret 330 appears as a vertical line that extends between two smaller horizontal lines. Those skilled in the art will recognize that caret 330 can have many different shapes, and typically appears as an arrow on desktop 322.

The position of caret 330 within the sentence of window 328 causes a tool tip 332 to appear. Tool tip 332 indicates who entered the word that caret 330 is positioned over.

Window 328 also includes a tool bar 334 that includes drawing tools that can be used to draw pictures in the document of window 328.

Under embodiments of the present invention, caret 330, tool tip 332, and tool bar 334 only appear in window 328 while the user is touching a portion of the input device. If the user is not touching the input device, caret 330, tool tip 332, and tool bar 334 disappear. FIG. 21 shows an image of display 320 when the user is not touching a portion of the input device. By eliminating tool bar 334, caret 330, and tool tip 332 when the user is not touching the input device, the present invention reduces the clutter found in window 328 and makes it easier for the user to read the document shown in window 328.

Those skilled in the art will recognize that the disappearance of cursor 330, tool tip 332, and tool bar 334 when the user is not touching the input device can be controlled independently. Thus, the user may customize window 328 such that tool tip 332, and tool bar 334 disappear when the user releases the input device, but caret 330 remains visible. In addition, the rate at which items disappear and reappear can be controlled. Thus, it is possible to fade images off the display and to fade them back onto the display as the user releases and then touches the input device. In some embodiments, the fade-out period is 2.0 seconds to minimize distraction, and the fade-in period is 0.0 seconds for the cursor, which appears instantly and 0.3 seconds for toolbars.

FIGS. 22, 23, and 24 show a series of display screens that include pull-down menus that are displayed as a result of keyboard messages from keyboard 300 of FIG. 18. In particular, in screen image 350 of FIG. 22, an application generates an active window 352 on virtual desktop 354 that includes an image of a pull-down menu 356. Pull-down menu 356 is associated with a menu heading entitled "Tools" found in a menu bar 358. Pull-down menu 356 is displayed in response to a keyboard message that indicates that the user is touching but not depressing one of the keys of numeric keypad 304 of keyboard 300.

In other embodiments, the user may move left and right across menu bar 358 by using the keys representing the numbers "4" and "6" on numeric keypad 304. As the user moves across menu bar 358 a different pull-down menu is displayed for each respective menu heading. Specifically, by touching the key representing the number "4", the user causes a keyboard message to be sent to the application, which changes the display so that the menu heading to the left of the current menu heading in header menu 358 is displayed. Thus, if the pull-down menu for the menu heading "Tools" is currently displayed in window 352,. touching the key representing the number "4" causes a pull-down menu associated with the menu heading "Insert" to be displayed. Similarly, the user can cause a pull-down menu to appear for a menu heading to the right of the current menu heading by touching the key representing the number "6" on numeric keypad 304. Thus, if the current pull-down menu is associated with the menu heading "Tools", and the user touches the key representing the number "6", the pull-down menu associated with the menu heading "Format" in header menu 358 will be displayed. This is shown in FIG. 23 where pull-down menu 360 for the menu heading "Format" 358 is displayed.

By touching the keys representing the numbers "2" and "8" on numeric keypad 304, the user can also move up and down within a pull-down menu such as pull-down menu 360. As the user moves through a pull-down menu, different items within the pull-down menu become highlighted. An example of a highlighted entry is entry 362 of FIG. 23, which highlights the entry "Tabs" of pull-down window 360 as the current entry. If the user touches the key representing the number "8" while entry 362 is the current entry, the application that receives the associated keyboard message highlights entry 364 located above entry 362 as the current entry. If the user touches the key representing the number "2" while entry 362 is the current entry, entry 366 below entry 362 is highlighted as the current entry.

FIG. 23 can also be used to describe another embodiment of the present invention. In particular, pull-down window 360 may also be activated by positioning the caret over the menu heading "Format" and depressing a select button on a pointing device such as mouse 170 or track ball 220 of FIGS. 4A and 15, respectively. The user may select an entry in pull-down window 360 by moving the pointing device downward through the list of entries. As the user moves the input device, individual entries in the list are highlighted.

In the prior art, pull-down menu 360 will continue to be displayed, even if the caret is positioned outside of the pull-down menu itself. The only way to make the pull-down menu disappear is to click on an area outside of the menu itself. However, under an embodiment of the present invention, the application that produces the pull-down menu, removes the pull-down menu as soon as it receives a mouse message that indicates that the user released the pointing device. This improves user efficiency by reducing the movements the user must make to close the pull-down windows associated with header menu 358.

FIG. 25 is an image of a display screen that includes a radial menu 370 that is displayed under an alternative embodiment of the present invention. Radial menu 370 includes eight entries arranged in a circle 371 around a cancel button 372. Radial menu 370 may either be manipulated by using keyboard 300 of FIG. 18 or by using the touch sensors on button 670 of the mouse of FIG. 10H.

Using keyboard 300, a focus application displays radial menu 370 when it receives a keyboard message indicating that a user touched one of the keys in key pad 304. To highlight a specific entry, the user touches a key in keypad 304 that is spatially related to the entry. For example, to highlight entry. 373 of radial menu 370, the user touches the key representing the number "8", which is located directly above a center key representing the number "5" because the spatial positioning of the "8" key relative to the "5" key is the same as the spatial relationship between entry 373 and cancel button 372. To select an entry, the user depresses the key that causes the entry to be highlighted. To dismiss the radial menu, the user depress the "5" key.

To manipulate the radial menu using the touch sensors of button 670 on the mouse of FIG. 10H, the user simply touches the touch sensor that corresponds to an entry on the radial menu. Simply touching the corresponding touch sensor causes the entry to be highlighted. Depressing button 670 while touching the corresponding touch sensor causes the entry to be selected. The application determines that both events have occurred based on two separate mouse messages. A first mouse message indicates which touch sensor is currently being touched. A second mouse message indicates that the left button has been depressed FIGS. 26A, 26B, and 26C, show images of screens displayed by a program application of the present invention that depict an animation created by the application. In particular, these Figures show the animation of a caret "sonar" that is formed by sequentially placing rings around the caret. This animated sonar is initiated under the present invention when the user initially touches an input device such as mouse 170 of FIG. 4A.

The animation can be seen in FIGS. 26A, 26B, and 26C by viewing the respective displays 400, 402, and 406 as a sequence of displays that are presented to the user in that order. In display 400 of FIG. 26A, caret 406, which appears as an arrow, is shown without any surrounding graphics. In display 402, caret 406 is surrounded by a circle 408. In display 404, caret 406 is surrounded by two circles 408 and 410. Under one embodiment, the animation of FIGS. 26A, 26B, and 26C only last for 0.3 seconds after the user initially touches the input device.

FIG. 26A can also be used to describe another embodiment of the present invention. Specifically, under this embodiment of the present invention, caret 406 of FIG. 26A will not move unless the input device is being touched by the user while it is being moved.

Thus, if mouse 170 moves because the user accidentally kicks the cord of the mouse, caret 406 will not move under the present invention since the user was not touching the mouse directly. Under prior art systems, applications moved the caret upon receiving a mouse message that indicated that the mouse had been moved. Under the present invention, the application only moves the caret if it receives a message that the mouse is being touched and a message that the mouse has moved. This helps to prevent unwanted movement of the caret.

In the prior art of computer systems, if the user has not moved the input device or has not entered text over a period of time, the computer system will initiate a screen saver program. Such a program provides a mostly black display to help reduce the wear on the screen. An example of a screen saver is shown in FIG. 27. Under the present invention, the screen saver application will be stopped when -the user touches an input device of the present invention. Thus, the user does not have to move the input device as in the prior art, but only has to touch the input device in order to stop the screen saver program and to redisplay the virtual desktop. Thus, when the user touches the input device, screen saver display 430 is replaced with a desktop display such as display 400 of FIG. 26A.

In some embodiments of the present invention, the input device includes enough touch sensors that it is possible for the present invention to identify how the user is gripping the input device. For example, mouse 690 of FIGS. 9A, 9B, 9C, which is referred to by the inventors as a "pinch" mouse, includes two side touch sensors 692 and 696 and a palm rest touch sensor 694. Thus, it is possible for the applications of the present invention to identify which touch sensors the user is touching based on a collection of device messages and thus, how the user is gripping mouse 690.

This information can be used to control how the caret moves on the display. For example, under one embodiment of the present invention, if the user is gripping mouse 690 so that the user's thumb is touching left side sensor 692 and their palm is touching palm rest touch sensor 694, the caret moves relatively large distances across the display for fixed movements of mouse 690. If the user is gripping mouse 690 such that the user is touching left side sensor 692, right side sensor 696 but not palm rest touch sensor 694, the caret moves small distances for the same fixed movement of mouse 690. This provides more flexibility in the control of the caret and is useful in programs where the caret is used to draw on the screen, to place the cursor on the screen, and to move objects.

In an alternative embodiment, the manner in which the user grips the input device can be used to control the width of an ink trail produced behind the caret as the user moves the input device. FIG. 28 is an image of a display 436 showing two ink trails 438 and 440 of different widths. Under this embodiment of the invention, these ink trails are produced when the user grips the input device in two different ways. For example, narrow-width ink trail 438 is produced when the user touches both left side sensor 692 and right side sensor 696 of mouse 690. On the other hand, thick-width ink trail 440 is produced when the user touches left side sensor 692 and palm-rest touch sensor 694 but not right side sensor 696.

In further embodiments of the present invention, ink trails, such as ink trails 438 and 440 of FIG. 28 can be produced by touching a button on an input device such as button 174 of FIG. 4A. In the prior art, such ink trails are usually only produced if the button is depressed. Under the present invention, the user does not have to strain to maintain pressure on the button while producing the ink trail. Instead, the user only needs to keep their finger in contact with the button. Similarly, in some embodiments of the present invention, the user may open boxes, drag objects, and initiate commands by simply touching the top of the button instead of having to depress the button. The movement of the object, box, or ink trail is then controlled by the movement of the input device by the user while the user maintains contact with the button.

The user may also place a cursor within a hypertext link, such as link 457 of FIG. 29, by touching a button on the input device while a displayed caret 458 is positioned over the link. The user activates the link by depressing the button. Such embodiments make it easier to place a cursor within a link without activating the link.

In one embodiment of the present invention, multiple touch areas on an input device can be used to page backwards and forwards through web pages provided by an Internet browser. Examples of input devices having multiple touch sensitive areas useful in paging are the mice of FIGS. 10C, 10D, 12A, 12B, 13A, 13B, and 13C. In FIG. 10C, touching region 624 and then region 626 initiates a page backward function and touching region 626 and then region 624 initiates a page forward function. In FIG. 10D, touching region 637 and then region 634 initiates a page backward function and touching region 634 and then region 637 initiates a page forward function. In FIGS. 12A and 12B, touching regions 722 and 724, respectively, and then regions 720 and 728, respectively, initiates page forward functions and touching regions 720 and 728, respectively, and then regions 722 and 724, respectively, initiates page backward functions. In FIGS. 13A, 13B, and 13C, touching regions 734, 738, and 746, respectively, and then touching regions 736, 742 and 748, respectively, initiates page forward functions and touching regions 736, 742, and 748, respectively, and then touching regions 734, 738, and 746, respectively, initiates page backward functions.

Note that a mouse of the present invention can be configured so that paging functions are initiated simply by touching one touch sensor instead of touching a sequence of two touch sensors. Thus, in FIG. 10C touching region 624 can initiate a page forward function and touching region 626 can initiate a page backward function. Similarly, touching region 734 of FIG. 13A can initiate a page forward function and touching region 736 of FIG. 13A can initiate a page backward function. In this context, the touch sensors of the present invention provide the functionality of the side switches found in a patent application filed on even date herewith entitled "INPUT DEVICE WITH FORWARD/BACKWARD CONTROL", and identified by attorney docket number M61.12-0083, the inventors of which were under a duty to assign the application to the assignee of the present application.

The paging functions performed using these touch areas are shown in FIGS. 30, 31, and 32. In FIG. 30 display 460 shows an Internet browser window 462 that depicts a current page 464. A user can page backward to the Internet page that was displayed before current page 464 to display a past page 470 of FIG. 31, which is shown in Internet browser window 472. The user can move forward to a next page 476, shown in browser window 478 of display 480 in FIG. 32, using the touch sensor combination described above. In order to be able move forward to next page 476, the user must at some point move backward from next page 476 to current page 464.

Input devices of the present invention also allow for scrolling through pages of documents on a line-by-line basis. In particular, the mice of FIGS. 10B nd 13D allow for scrolling using a series of touch sensor strips on the left button and on the left side of the mouse, respectively. When the user strokes the strips by moving their thumb or finger toward their hand, the document is scrolled downward. When the user strokes the strips in the opposite direction, the document is scrolled upward. In some embodiments, the speed at which the strips are stroked determines the scroll rate.

Scrolling under the present invention is also accomplished using the mice embodiments of FIGS. 14A, 14B, 14C, and 14D. In these embodiments, when the user rolls the wheel of the mouse toward their hand, the document scrolls down. When the user rolls the wheel away from their hand, the document scrolls up. In addition, if the user's finger remains in contact with a touch sensor on the wheel or on a touch sensor behind the wheel after rotating the wheel backward, the document will continue to scroll until the user releases the touch sensor. Similarly, if the user's finger remains in contact with a touch sensor on the wheel or a touch sensor in front of the wheel after the user has rolled the wheel forward, the document will continue to scroll up until the user releases the touch sensor. The sensor in front of the wheel can also be tapped by rapidly touching and releasing the touch sensor in order to page down through the document. Similarly, the sensor behind the wheel can be tapped to page up through the document.

In addition to controlling the output images provided to the user, applications of the present invention also control audio signals presented to the user based on touch-indicative signals provided by an input device of the present invention. In some embodiments of the present invention, some audio signals are suppressed if the user is touching the input device. In other embodiments, audio signals are suppressed if the user is not touching the input device. The audio signals can include notification signals such as mail chimes, and hourly clock bells.

Under some embodiments of the present invention, computer-executable instructions determine at least one characteristic of how a user touches an input device based on a touching signal from the input device. Other instructions record profile information about the user based on this characteristic. One simple characteristic is whether the user is touching the input device. Under an embodiment of the present invention, whether the user is touching the input device is recorded and is transmitted over a network to other users to indicate that the user is present at their station.

Additionally, the amount of time that the user spends touching the input device can be recorded. This information can be refined to reflect the amount of time that the user is touching the input device while a certain page from the network is displayed as the top-most page on their computer screen. This is useful in determining the amount of time that the user spends looking at a page from the network for instance a page from the Internet. Being able to track the amount of time a user spends looking at particular pages on the Internet makes it possible to track user interest in pages and to make more accurate determinations of whether a user was likely to have viewed an advertisement on an Internet page.

The mice embodiments and the keyboard embodiment of the present invention described above are particularly useful for collecting this type of information. For the keyboard of FIG. 18, signals from touch sensors 306, 307, 309 and 311 are used to collect this type of information.

In other embodiments of the present invention, computer-executable instructions determine what hand the user uses to grip the input device. For example, since mouse 170 has side areas 184 and 186, the computer system can determine if the user is gripping the mouse with their right-hand or their left hand. If the user grips mouse 170 with their right hand, side area 186 will be covered by the user's thumb. If the user grips mouse 170 with their left hand, side area 186 will not be covered by the user's thumb. By identifying which hand the user uses to grip the mouse, the computer system can identify the user's dominant hand and can allocate functions to the input device's buttons based on the user's dominant hand. Thus, if the left button on the mouse is used for click and drag functions for right handed users the right button on the mouse is used for click and drag functions for left handed users. This allows both left-handed and right-handed users to use the same fingers to activate the same functions.

In one embodiment of the present invention, a computer system has computer-executable instructions for determining if the user is touching the input device and for initiating the spinning of a disk drive when it is determined that the user is touching the input device. Thus, the disk drive would remain inactive until it is determined that the user is touching the input device, which would be an indication that the computer system may need to access the disk drive.

In another embodiment of the present invention, a computer system determines if the user is touching a headset that is capable of converting a user's speech into an electrical signal. If the system determines that the user is touching the headset, it activates a speech recognition program so that the speech recognition program processes the electrical signals produced by the headset. In other embodiments, the system only activates the speech recognition program if the user is touching a mouse. In still other embodiments, the user must touch both the headset and the mouse to activate the speech recognition program. By only activating the speech recognition system when an input device is touched, the embodiment of the invention reduces unwanted processing of speech that was not directed toward the speech recognition system.

In yet another embodiment of the present invention, a television or an Internet set-top system utilizes a remote control that includes at least one touch sensor. Such Internet set-top systems provide access to the Internet using a television as a display unit. Some Internet set-tops can also integrate television programs with Internet based information.

FIG. 33 shows one embodiment of a remote control 500 for an Internet set-top system or television system under the present invention. Remote control 500 includes on its palm rest a touch sensor 502, which includes a conductive film. In one embodiment of remote control 500, the remote control enters an inactive state when the user is not touching touch sensor 502.

In the inactive state, remote control 500 uses less power than in its active state and thus conserves the power of the batteries in the remote control. In another embodiment of remote control 500, a speech recognition program is activated when the user contacts touch sensor 502.

In further embodiments of the present invention, a computer system suppresses processor intensive computer-executable instructions if it determines that the user is not touching an input device. Specifically, the invention suppresses instructions that produce images on the display or that produce audio signals. The reason for suppressing these instructions is that the may be wasted since it is likely that the user is not viewing the display if they are not touching an input device.

By suppressing these processor intensive instructions, the present invention increases the execution speed of many applications.

Although the present invention has been described with reference to particular embodiments, workers skilled in the art will recognize that changes may be made in form and detail without departing from the spirit and scope of the invention.

What is claimed is:

1. An input device for a computer system, said input device having a palm rest portion for permitting engagement by a palm of a user, said input device comprising:

an input generator capable of generating input information to be sent to the computer system, said input information comprising at least one of the following:
(1) a depressible key's state, (2) a depressible button's station, (3) sound information, or (4) movement information; and
a touch sensor, said touch sensor covering a substantial portion of said palm rest portion and adapted to generate an electrical signal when a user touches the touch sensor, the electrical signal containing touch information that is the same each time the user touches the touch sensor regardless of where the user's touch occurs on the touch sensor.

2. The input device of claim 1 wherein the input device is a remote control for an Internet set-top system.

3. The input device of claim 1 wherein the input device is a remote control for a television system.

4. The input device of claim 1 wherein the input device is a keyboard.

5. The input device of claim 4 wherein the touch sensor is located on a portion of an outer casing of the keyboard.

6. The input device of claim 5 wherein the touch sensor is located on the outer casing proximate a space bar key.

7. The keyboard of claim 5 wherein the touch sensor is located on the outer casing proximate at least one arrow keys representing desired movement for a cursor on a display.

8. The input device of claim 5 wherein the touch sensor is located on the outer casing proximate a set of keys representing a numeric key pad.

9. The input device of claim 8 further comprising a touch sensor located on top of one of the keys in the set of keys representing a numeric key pad.

10. The input device of claim 1 wherein the input device is a mouse.

11. The input device of claim 10 further comprising a wheel, a second touch sensor located in front of the wheel and a third touch sensor located behind the wheel.

12. The input device of claim 10 wherein the input generator comprises a first transducer located beneath a button on the mouse and the mouse further comprises a second touch sensor on the exterior of the button.

13. The input device of claim 12 wherein the first touch sensor extends along a side of the mouse.

14. The input device of claim 13 further comprising a second transducer located beneath a second button on the mouse and a third touch sensor on the exterior of the second button.

15. The input device of claim 10 further comprising a second touch sensor located on a first side of the mouse.

16. The input device of claim 15 wherein the input generator comprises a first input transducer located under a button on the mouse and the mouse further comprises a third touch sensor located on the exterior of the button.

17. The input device of claim 15 further comprising a third touch sensor located on a second side of the mouse opposite the first side of the mouse.

18. The input device of claim 10 wherein the input generator comprises a switch located beneath a button of the mouse and a second touch sensor is located on the exterior of the button.

19. The input device of claim 18 further comprising multiple touch sensors on the exterior of the button.

20. The input device of claim 10 further comprising a depressible wheel wherein the input generator comprises a switch capable of indicating when the depressible wheel is depressed.

21. An input device for a computer system comprising:
an exterior surface;
an input generator capable of generating input information to be sent to the computer system, said input information comprising at least one of the following:
(1) a depressible key's state, (2) a depressible button's station, (3) sound information, or (4) movement information; and
a plurality of touch sensors located on the exterior surface of the input device, one of said touch sensors being located on the top surface, said touch sensors arranged to generate electrical signals based upon whether the sensors are being touched, a combination of the electrical signals indicative of the manner in which the user is holding the input device at a given time.

22. The input device of claim 21, wherein the plurality of touch sensors are arranged to generate electrical signals that indicate by which hand the user holds the input device.

23. The input device of claim 21 wherein the touch sensors are arranged to generate electrical signals that indicate if the user is holding the input device by touching two opposing sides of the input device.

24. An input device for controlling the movement of a cursor on a display in a computer system, comprising:
a top surface;
a touch sensitive palm rest located on said top surface and adapted to generate an electrical signal when a user touches any portion of said palm rest, the electrical signal being the same regardless of which portion of said palm rest the user touches.

25. An input device for controlling the movement of a cursor on a display in a computer system, comprising:
body having a top surface;
a movement transducer adapted to generate a cursor control command signal responsive to a user action to control movement of the cursor, the cursor control command signal being sent to the computer system to control cursor movement;
a plurality of touch sensors including a first touch sensor located on the top surface and a second touch sensor, each touch sensor adapted to generate an electrical signal representing whether said touch sensor is being touched by a user, a combination of the respective electrical signals being sent to the computer system at a given time for further processing regardless of whether movement of the cursor is being controlled.

26. The input device of claim 25, further comprising means, coupled to said touch sensors, for generating a signal representative of a current state of said touch sensors based on the combination of the electrical signals.

27. The input device of claim 21, further comprising means, coupled to said touch sensors, for generating an electrical signal representative of a current state of said touch sensors based on the combination of the electrical signals.

28. The input device of claim 1, wherein the touch sensor covers the entire palm rest portion.

* * * * *